US008755340B2

(12) United States Patent
Anderson et al.

(10) Patent No.: US 8,755,340 B2
(45) Date of Patent: Jun. 17, 2014

(54) RELEASING WIRELESS RESOURCES

(75) Inventors: Nicholas William Anderson, Warmley (GB); Gordon Peter Young, Shipston-on-Sour (GB); Richard Charles Burbidge, Hook (GB)

(73) Assignee: BlackBerry Limited, Waterloo, Ontario (CA)

( * ) Notice: Subject to any disclaimer, the term of this patent is extended or adjusted under 35 U.S.C. 154(b) by 424 days.

(21) Appl. No.: 12/942,007

(22) Filed: Nov. 8, 2010

(65) Prior Publication Data

US 2012/0113904 A1     May 10, 2012

(51) Int. Cl.
*H04W 4/00*          (2009.01)

(52) U.S. Cl.
USPC ......................................................... 370/329

(58) Field of Classification Search
USPC ......................................................... 370/329
See application file for complete search history.

(56) References Cited

U.S. PATENT DOCUMENTS

| 2007/0135080 | A1  | 6/2007  | Islam et al.    |         |
|--------------|-----|---------|-----------------|---------|
| 2008/0267118 | A1* | 10/2008 | Cai et al.      | 370/329 |
| 2009/0129339 | A1  | 5/2009  | Young et al.    |         |
| 2009/0196256 | A1* | 8/2009  | DiGirolamo et al. | 370/331 |
| 2010/0080155 | A1  | 4/2010  | Suzuki et al.   |         |
| 2011/0268045 | A1* | 11/2011 | Heo et al.      | 370/329 |
| 2012/0087254 | A1* | 4/2012  | Yin et al.      | 370/252 |
| 2013/0010743 | A1* | 1/2013  | Ahn et al.      | 370/329 |

FOREIGN PATENT DOCUMENTS

| EP | 1986459 A1   | 10/2008 |
|----|--------------|---------|
| EP | 1973358 B1   | 4/2009  |
| WO | 2009/047025  | 4/2009  |
| WO | 2009/104086  | 8/2009  |
| WO | 2010/078365  | 7/2010  |

OTHER PUBLICATIONS

Alcatel-Lucent; "DL Control Signaling and Multiplexing for VoIP" (R1-071721); 3GG TSG RAN WG1 Meeting #49bis; St. Julians, Malta; Mar. 26-30, 2007; 4 pages.
LG Electronics Inc.; "Uplink Scheduling for VoIP" (R2-063273); 3GPP TSG RAN WG2 #56; Riga, Latvia; Nov. 6-10, 2006; 3 pages.
International Search Report and Written Opinion of the International Searching Authority issued in International Application No. PCT/EP2011/069666 on Feb. 15, 2012; 14 pages.
Mikio Iwamura et al. Carrier Aggregation Framework in 3GPP LTE-Advanced (WiMAX/LTE Update) XP011315996, IEEE Communications Magazine, IEEE Service Center, Piscataway, US, vol. 48, No. 8, Aug. 1, 2010.
International Search Report issued in international application No. PCT/EP2011/069471 on Jan. 6, 2012; 4 pages.
International Search Report issued in International Application No. PCT/EP2011/069472 on Feb. 28, 2012; 4 pages.
International Preliminary Report on Patentability issued in international No. PCT/EP2011/069472 on May 23, 2013; 10 pages.
International Preliminary Report on Patentability issued in international No. PCT/EP2011/069471 on May 23, 2013; 10 pages.

(Continued)

*Primary Examiner* — Shripal Khajuria
(74) *Attorney, Agent, or Firm* — Fish & Richardson P.C.

(57) ABSTRACT

A wireless network, such as an LTE ("Long-Term Evolution") network, may be configured to a receive an identifier associated with resource configurations in a wireless network. The identifier is mapped to a resource configuration in a plurality of resource configurations. The user equipment applies the resource configuration.

24 Claims, 16 Drawing Sheets

(56) References Cited

OTHER PUBLICATIONS

Office Action issued in U.S. Appl. No. 12/942,013 on Dec. 30, 2013; 11 pages.
Office Action issued in U.S. Appl. No. 12/942,013 on Aug. 29, 2013; 8 pages.
International Preliminary Report on Patentability issued in International Application No. PCT/EP2011/069666 on May 23, 2013; 10 pages.
3GPP TS 25.331 V10.1.0 3rd Generation Partnership Project; Technical Specification Group Radio Access Network; Radio Resource Control (RRC); Protocol specification (Release 10); Sep. 2010.
3GPP TS 36.321 V9.3.0 3rd Generation Partnership Project;Technical Specification Group Radio Access Network; Evolved Universal Terrestrial Radio Access (E-UTRA);Medium Access Control (MAC) protocol specification(Release 9); Jun. 2010.
3GPP TS 36.331 V9.4.0 3rd Generation Partnership Project;Technical Specification Group Radio Access Network; Evolved Universal Terrestrial Radio Access (E-UTRA);Radio Resource Control (RRC); Protocol specification (Release 9) Sep. 2010.

* cited by examiner

RELEASING WIRELESS RESOURCES

BACKGROUND

This document relates to wireless communications in wireless communication systems.

Wireless communication systems can include a network of one or more base stations to communicate with one or more wireless devices such as fixed and mobile wireless communication devices, mobile phones, or laptop computers with wireless communication cards that are located within coverage areas of the wireless systems. Base stations can emit radio signals that carry data such as voice data and other data content to wireless devices. A base station can transmit a signal on a forward link (FL), also called a downlink (DL), to one or more wireless devices. A wireless device can transmit a signal on a reverse link (RL), also called an uplink (UL), to one or more base stations. Further, a wireless communication system can include a core network to control the base stations.

A wireless device can use one or more different wireless technologies such as orthogonal frequency-division multiplexing (OFDM) or code division multiple access (CDMA) based technologies for communications. Various examples of standards for wireless technologies include Long-Term Evolution (LTE), Universal Mobile Telecommunications System (UMTS), CDMA2000 1x, Worldwide Interoperability for Microwave Access (WiMAX), Global System for Mobile Communications (GSM), and General Packet Radio Service (GPRS). In some implementations, a wireless communication system can include multiple networks using different wireless technologies. A wireless device can be referred to as user equipment (UE), access terminal (AT), a mobile station (MS), a mobile device (MD) or a subscriber station (SS). A base station can be referred to as an access point (AP) or access network (AN). Examples of base stations include Node-B base stations and eNode-B base stations.

DETAILED DESCRIPTION

Figure 1:
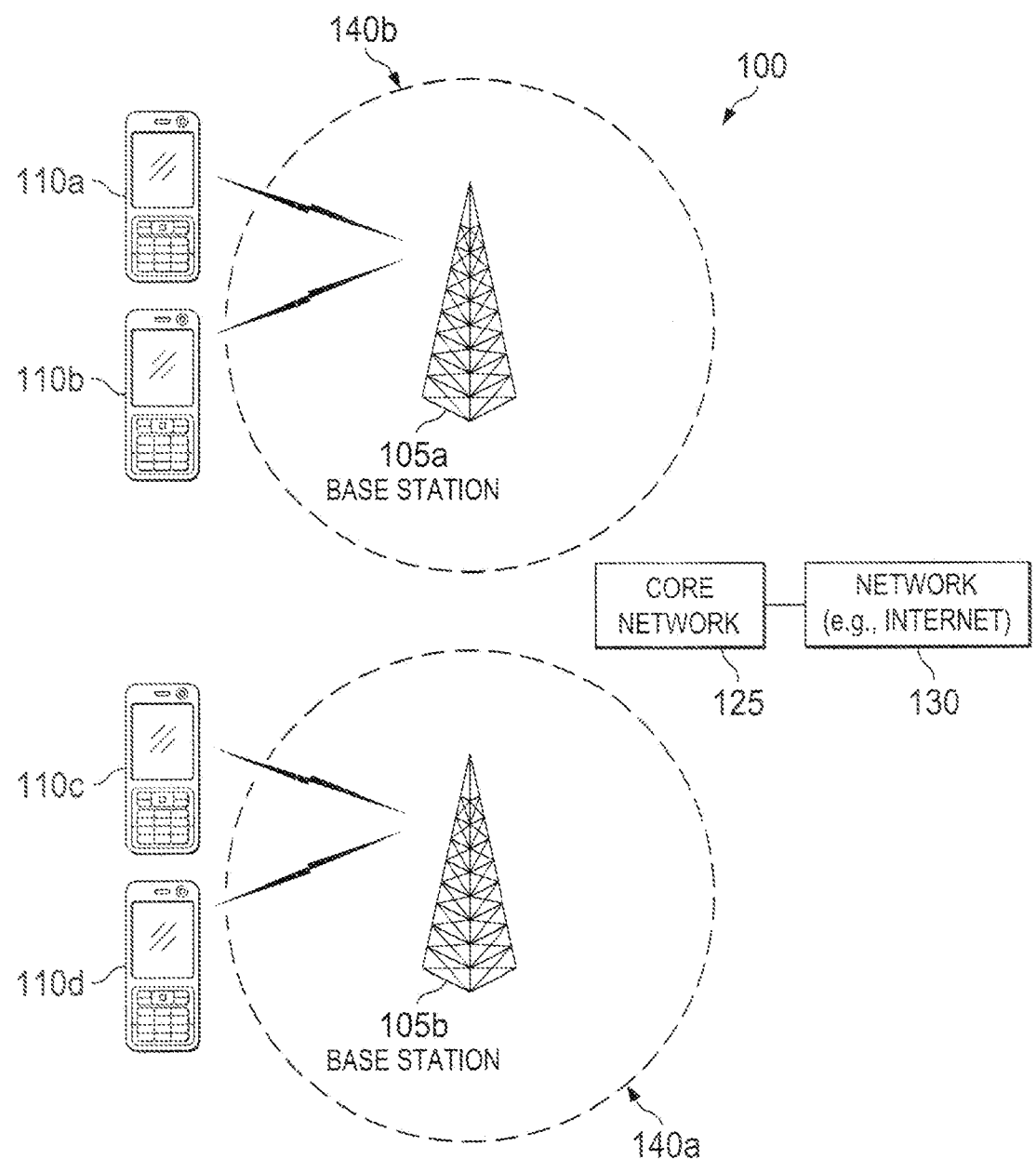
FIG. 1 shows an example of a wireless communication system.

FIG. 1 shows an example of a wireless communication system. A wireless communication system includes one or more radio access networks 140 and one or more core networks 125. Radio access network 140 includes one or more base stations (BSs) 105a, 105b. The system may provide wireless services to one or more wireless devices 110a, 110b, 110c, and 110d. Base stations 105a and 105b can provide wireless service to wireless devices 110a-d in one or more wireless sectors. In some implementations, base stations 105a, 105b use directional antennas to produce two or more directional beams to provide wireless coverage in different sectors. A core network 125 communicates with one or more base stations 105a and 105b. In some implementations, a core network 125 includes one or more base stations 105a and 105b. The core network 125 may include wireless communication equipment such as one or more servers. In some implementations, the core network 125 is in communication with a network 130 that provides connectivity with other wireless communication systems and wired communication systems. The wireless communication system may communicate with wireless devices 110a-d using a wireless technology such as one based on orthogonal frequency division multiplexing (OFDM), Orthogonal Frequency Division Multiple Access (OFDMA), Single Carrier Frequency Division Multiple Access (SC-FDMA), Discrete Fourier Transform Spread Orthogonal Frequency Division Multiplexing (DFT-SOFDM), Space-Division Multiplexing (SDM), Frequency-Division Multiplexing (FDM), Time-Division Multiplexing (TDM), Code Division Multiplexing (CDM), or others. The wireless communication system may transmit information using Medium Access Control (MAC) and Physical (PHY) layers. The techniques and systems described herein may be implemented in various wireless communication systems such as a system based on Long Term Evolution (LTE) Global System for Mobile Communication (GSM) protocols, Code Division Multiple Access (CDMA) protocols, Universal Mobile Telecommunications System (UMTS), Unlicensed Mobile Access (UMA), or others.

Wireless devices, such as smartphones, may generate and consume significant amounts of data over a wide variety of data traffic types and services. Smartphone devices may be viewed as computing platforms with wireless connectivity, capable of running a wide-ranging variety of applications and services that are either pre-installed by the device manufacturer or installed by the user according to the user's specific usage requirements. The applications may originate from a wide-ranging group of sources such as software houses, manufacturers, and third-party developers.

Wireless networks may distinguish between user-plane traffic and control-plane traffic. Various examples of user-plane traffic and services carried by wireless networks include voice, video, internet data, web browsing sessions, upload/download file transfer, instant messaging, e-mail, navigation services, RSS feeds, and streaming media. Control-plane traffic signaling may be used to enable or support transfer of the user plane data via the wireless network, including, for example, mobility control and radio resource control functionality. Various examples of control plane traffic include core-network mobility and attachment control, (e.g., Non-Access Stratum (NAS) signaling), radio access network control (e.g., Radio Resource Control (RRC)), and physical layer control signaling such as may be used to facilitate advanced transmission techniques and for radio link adaptation purposes.

Applications, communicating via a wireless network, may utilize Internet-based protocols to achieve a desired effect when provisioning for a specific service. For example, a navigation application may utilize FTP and TCP for file transfer of mapping data from a server to a device. The navigation application may use periodic keep-alive signaling (e.g., exchanging PING messages) towards the navigation server to maintain an application-level connection in the presence of intermediary network nodes such as stateful firewalls. Similarly, an e-mail application may use a synchronization protocol to align mailbox contents on a wireless device with those in the e-mail server. The e-mail application may use a periodic server polling mechanism to check for new e-mail.

Wireless network designs are influenced by the data demands produced by various applications and associated data traffic distributions. For example, the amount and timing of data traffic may vary (e.g., bursty communications). To adapt, wireless communication networks may include dynamic scheduling such that a quantity of assigned shared radio resources may be varied in rapid response to data demand (e.g., data buffer status). Such dynamic scheduling can operate on a time scale of one to two or three milliseconds. At a time scale above this (e.g., operating in the region of 100 milliseconds to several seconds), wireless networks can use a state-machine-oriented process or other system reconfiguration process to adapt a radio connection state or sub-state to the degree of observed traffic activity. Radio connection states or sub-states may differ both in the degree of connectivity offered and in terms of the amount of battery power consumed by a wireless device.

A connectivity level can be characterized as representing connectivity attributes, such as location granularity, assigned resources, preparedness, and interfaces or bearers established. A location granularity attribute may be the accuracy to which a wireless network can track the current location of a wireless device (e.g., to the cell level for more active devices, or to only a group of cells for less active devices). Examples of assigned resource attributes include the presence, absence, type or amount of radio transmission resources available to the wireless device for performing communication, as a function of expected activity level.

A preparedness attribute is an ability of a wireless device to receive or transmit information. The power consumed by wireless devices may reflect a function of an ability of a wireless device (or readiness) to transmit or receive. For example, a wireless device can activate its receiver in order to receive downlink communication from a base station at any given instant, which may cause higher power consumption and battery drain. To save power, a mode referred to as discontinuous reception (DRX) may be used. In DRX, the wireless device can place its receiver in a sleep mode, e.g., turning off its receiver at certain times. The base station uses knowledge of a UE's DRX pattern (e.g., sequence of wake-up intervals of the device) when determining times to transmit to a wireless device that is in a DRX mode. For example, a base station determines a time in which the wireless device will be actively listening for a transmission. The activity cycle of a DRX pattern can vary as a function of an assigned radio connection state or sub-state.

Interfaces (or bearers-established) attributes are other examples of connectivity attributes. End-to-end communications (e.g., from a wireless device to a core network gateway or egress node towards the Internet) can require that user-specific connections, or bearers, are established between participating network nodes or entities. User-plane connectivity through a radio access network and a core network can require the establishment of one or more network interfaces between various pairs of network nodes. The establishment of one or more of these network interfaces can be associated with a radio connection state or sub-state as a function of the current activity level.

Figure 2:
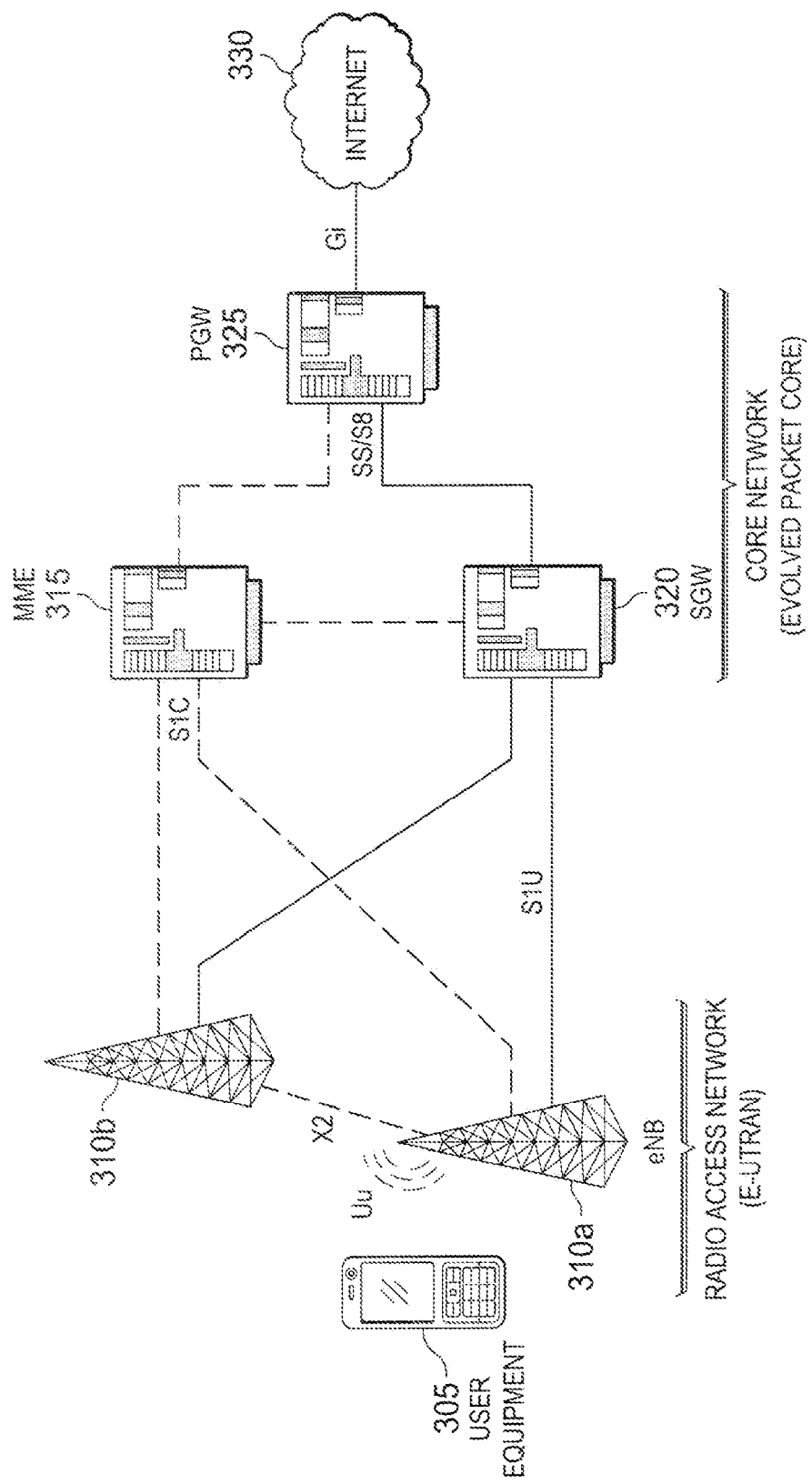
FIG. 2 shows an example of a wireless system architecture based on Long Term Evolution (LTE).

FIG. 2 shows an example of a wireless system architecture based on Long Term Evolution (LTE). A wireless communication system based on LTE can include a core network called an Evolved Packet Core (EPC) and an LTE Radio Access Network, e.g., evolved UTRAN (E-UTRAN). The core network provides connectivity to an external network such as the Internet 330. The system includes one or more base stations such as eNode-B (eNB) base stations 310a and 310b that provide wireless service(s) to one or more devices such as UEs 305.

An EPC-based core network can include a Serving Gateway (SGW) 320, a Mobility Management Endpoint (MME) 315, and a Packet Gateway (PGW) 325. The SGW 320 can route traffic within a core network. The MME 315 is responsible for core-network mobility control attachment of the UE 305 to the core network and for maintaining contact with idle mode UEs. The PGW 325 is responsible for enabling the ingress/egress of traffic from/to the Internet 330. The PGW 325 can allocate IP addresses to the UEs 305.

An LTE-based wireless communication system has network interfaces defined between system elements. The network interfaces include the Uu interface defined between a UE and an eNB, the S1U user-plane interface defined between an eNB and an SGW, the S1C control-plane interface defined between an eNB and an MME (also known as S1-MME), and the S5/S8 interface defined between an SGW and a PGW. Note that the combination of S1U and S1C is often simplified to "S1."

Figure 3:
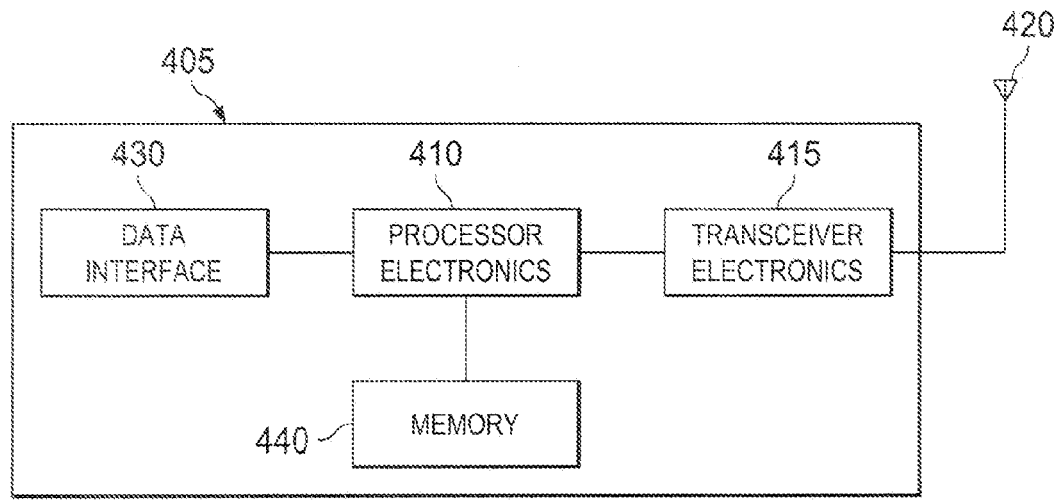
FIG. 3 shows an example of a radio station architecture.

FIG. 3 shows an example of a radio station architecture for use in a wireless communication system. Various examples of radio stations include base stations and wireless devices. A radio station 405 such as a base station or a wireless device can include processor electronics 410 such as a processor that implements one or more of the techniques presented in this document. A radio station 405 can include transceiver electronics 415 to send and receive wireless signals over one or more communication interfaces such as one or more antennas 420. A radio station 405 can include other communication interfaces for transmitting and receiving data. In some implementations, a radio station 405 can include one or more wired network interfaces to communicate with a wired network. In other implementations, a radio station 405 can include one or more data interfaces 430 for input/output (I/O) of user data (e.g., text input from a keyboard, graphical output to a display, touchscreen input, vibrator, accelerometer, test port, or debug port). A radio station 405 can include one or more memories 440 configured to store information such as data and/or instructions. In still other implementations, processor electronics 410 can include at least a portion of transceiver electronics 415.

A wireless device can transition between connection states, such as RRC connection modes. In the LTE system, two RRC connection modes exist, RRC connected and RRC idle. In an RRC connected mode, radio and radio access bearers (e.g., the Uu and S1 bearers) are established to enable the transfer of user plane data through a radio access network and onwards to the core network. In the RRC idle mode, radio and radio access bearers are not established and user-plane data is not transferred. In some implementations, a limited degree of control signaling is possible in idle mode to enable the wireless network to track the location of the device should a need for communications arise.

A wireless device, in an RRC-connected state, can use a DRX operational mode to conserve power by turning-off transceiver functionality, e.g., turning-off transceiver circuitry such as receiver circuitry. In some implementations, a wireless device ceases to monitor a wireless channel and, accordingly, ceases to operate a digital signal processor to decode wireless signals while in the DRX operational mode.

Figure 4:
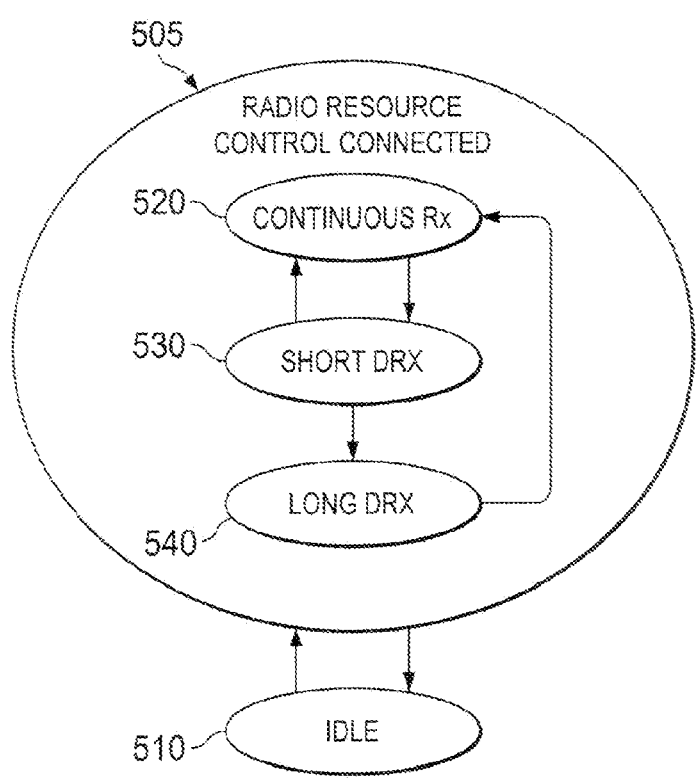
FIG. 4 shows an example of a transition diagram for Radio Resource Control (RRC) and discontinuous reception.

FIG. 4 shows an example of a transition diagram for RRC and DRX. RRC connection states include an RRC connected state 505 and an idle state 510. Transitions between the idle state 510 and the connected state 505 are effected via RRC establishment and release procedures. Such transitions can produce associated signaling traffic between a wireless device and a base station.

UE DRX functionality may comprise a mechanism to control when the UE monitors a wireless grant channel such as the downlink Physical Common Control Channel (PDCCH) in LTE by application of discontinuous reception. The specific times during which the UE may be active and capable of reception may be described by a time-domain pattern known as a DRX cycle. The time domain pattern may vary or may be reconfigured as a function of a data activity level. Such a variation or reconfiguration may further be triggered or controlled by timers. For a particular communication between a network and a UE, a plurality of possible DRX cycle configurations may exist and one of the plurality may be selected in accordance with a desired system operation for the communication. In such a case, the system may include a plurality of DRX sub-states and a controller configured to select an appropriate DRX sub-state from the plurality of DRX sub-states based, at least in part, on a desired system operation. Parameters or timers controlling or defining the DRX cycle may be associated with each of the plurality of DRX sub-states according to system configuration. In some implementations, DRX sub-states per-se may not be explicitly implemented and in such a case the term "DRX sub-state" may refer only to a particular configuration of parameters or condition of one or more timers (e.g., running or not running). The term "DRX sub-state" may therefore be used interchangeably with "DRX status" of DRX-related parameters or timers; hence, a configured plurality of DRX-related parameters may be referred to as a DRX sub-state.

The RRC connected mode state 505 may be associated with a plurality of DRX sub-states (or DRX status) within the Medium Access Control (MAC) layer. The DRX sub-states (or DRX status) include a continuous reception (continuous-rx) state 520, a short DRX state 530, and a long DRX state 540. In the continuous reception state 520, a device may be continuously monitoring all or almost all downlink sub-frames for wireless traffic and can transmit data. In the short DRX state 530, the device can be controlled to turn off its receiver (e.g., sleep, or DRX) for all but Q out of N sub-frames. In the long DRX state 540, the device can be controlled to turn off its receiver (e.g., sleep, or DRX) for all but Q out of M sub-frames, where M is typically greater than N. In one example, Q equals 1, N equals 8 and M equals 256. In an LTE-based system, a sub-frame is a 1 millisecond unit of transmission time.

In some implementations, an expiration of an inactivity timer causes a state transition (e.g., continuous reception state 520 to short DRX state 530 or short DRX state 530 to long DRX state 540). Resumption of activity, such as the device having data to transmit or receiving new data, can cause a transition from a DRX state 530, 540 to the continuous reception state 520. In some implementations, a base station sends a MAC command that causes a transition from the continuous reception state 520 to one of the DRX states 530, 540. In other words, MAC commands may also be used by the network (sent from eNB to the UE) in order to explicitly direct a transition to a different DRX sub-state with a longer DRX cycle. A resumption of data activity typically results in a transition to the continuous reception sub-state. Transitions between Idle and Connected Mode may be effected using explicit RRC establishment and release signaling procedures, which involves associated signaling overheads. The base station's decision to send a MAC command to cause the UE to transition to another DRX may be based on timers within the network, or may be based on a plurality of other factors or events. In one improved method, the base station may send the MAC command in response to a fast dormancy request received from the UE, the fast dormancy request indicating the UE's desire to be transitioned to a more battery-efficient state, the more battery-efficient state comprising a new DRX sub-state or new DRX status. The UE may transmit a fast dormancy request (e.g., explicit message, indication message) to the network based on a determination that no more data transfer is likely for a prolonged period. For example, the UE may transmit the explicit message (e.g., an indication message) requesting an updated sub-state to a more battery efficient sub-state and the request to release resources. In some implementations, the explicit message (or indication message) may be a Signaling Connection Release Indication (SCRI) message. The UE's step of determining may involve an appraisal of currently-operational applications or processes running on the mobile device, and/or the status of acknowledged mode protocols or acknowledged mode transfer of data. For example, if the UE is aware that a particular data transfer has ended due to its reception of an acknowledgement message, the UE may decide to send a fast dormancy request to the network. The network may respond with a message to the UE to indicate that it should move to a new DRX sub-state or to otherwise alter its DRX status. This message may be sent within a MAC CE command or may be sent within a physical layer message such as on a PDCCH. In the improved method, receipt of the message at the UE not only triggers a transition to a new DRX sub-state or a change in DRX status, but also triggers a release of assigned uplink control resources. Thus, by use of this improved method, the network does not need to send a further message specifically for the purposes of releasing the uplink resources, and signaling overheads are thereby reduced.

In each of these DRX sub-states, both the UE and network can, in some implementations, be synchronized in terms of the currently-applicable DRX status or DRX sub-state such that both the network and UE identify when the UE receiver is active and when the UE receiver may be "off", "asleep" or otherwise inactive. Within the connected mode, the synchronization may be achieved using network-configured timers and/or parameters.

The LTE system may also provide for DRX battery saving in RRC Idle. When in Idle Mode, the UE may employ a DRX pattern according to a so-called paging cycle. On a possible paging occasion, the UE may activate its receiver to check for a page message sent by the network. At other times, the UE may deactivate its receiver in order to conserve power.

Based on the illustrated transition diagram, within the LTE system, two different approaches may be employed to control the UE's RRC state as a function of data activity or inactivity. In the first approach, inactive devices may be transitioned to idle mode relatively quickly. A resumption of data activity may invoke execution of RRC connection establishment procedures and may incur signaling overhead. In the second approach, inactive devices may be held for a considerable time (for example, many minutes, even hours) in RRC Connected Mode before a transition to idle is executed.

A UE may have a lower power consumption in RRC idle mode than in RRC Connected Mode; therefore, from a UE power consumption perspective, the first approach may provide power saving advantages when compared to the second approach. However, to transfer those UEs that have been inactive for a period of time to the RRC idle state may require use of an explicit RRC connection release message sent by the eNB to the UE. An RRC connection setup procedure may also be used upon each resumption of data activity. Hence, whilst the first approach can be battery efficient, the first approach may include potentially large signaling overheads and therefore lower system efficiency.

The signaling overheads associated with the first approach may be substantially avoided using the second approach. Though, the second approach may include increased battery consumption by the mobile device (this being a function of how battery efficient the DRX procedures are when in connected mode). Furthermore, power consumption within an RRC connected mode DRX sub-state may also be higher than that of Idle Mode due to the use of network controlled mobility when in RRC Connected Mode. In Connected Mode, the UE typically sends signal strength/quality measurement reports to the eNB either periodically, or on a triggered basis (for example, on detection of deteriorating signal conditions). The eNB may then be in control of when to direct the UE to hand over to another cell. Conversely, in RRC Idle Mode, mobility may be UE-controlled. That is, the UE may not report the signal strength/quality of other cells to the network but may use its own measurements of such to select the preferred cell. Cells within the network may be arranged into logical groups known as tracking areas, each of which may consist of a plurality of cells. When in RRC Idle Mode, the UE may notify the network when changing to a cell within a new tracking area. This process (known as a tracking area update) typically occurs relatively infrequently and, in addition to the infrequent paging/DRX cycles, may reduce UE battery consumption whilst in the RRC Idle Mode.

The first approach may be referred to as a "call-oriented" model. A burst of data activity may be treated similar to a phone call or other communication session, wherein at a macro level the packet data "call" is either "on" or "off". Within a packet data call and on a micro time scale, data activity may not be continuous, but the packet call may be treated as "active" or "in-call" by the network for a relatively short period of time. The UE may be held in the RRC connected mode for the duration of the packet call. For sustained inactivity beyond this relatively short period of time, the UE may transition to Idle. With this understanding, a packet call can, in some implementations, comprise a burst of packet activity spanning only a few hundred milliseconds or up to a few seconds, for example, when downloading a particular web page from the internet. Subsequent packet calls with associated transitions to/from Idle may exist for other web pages accessed perhaps 20 seconds later.

Figure 5:
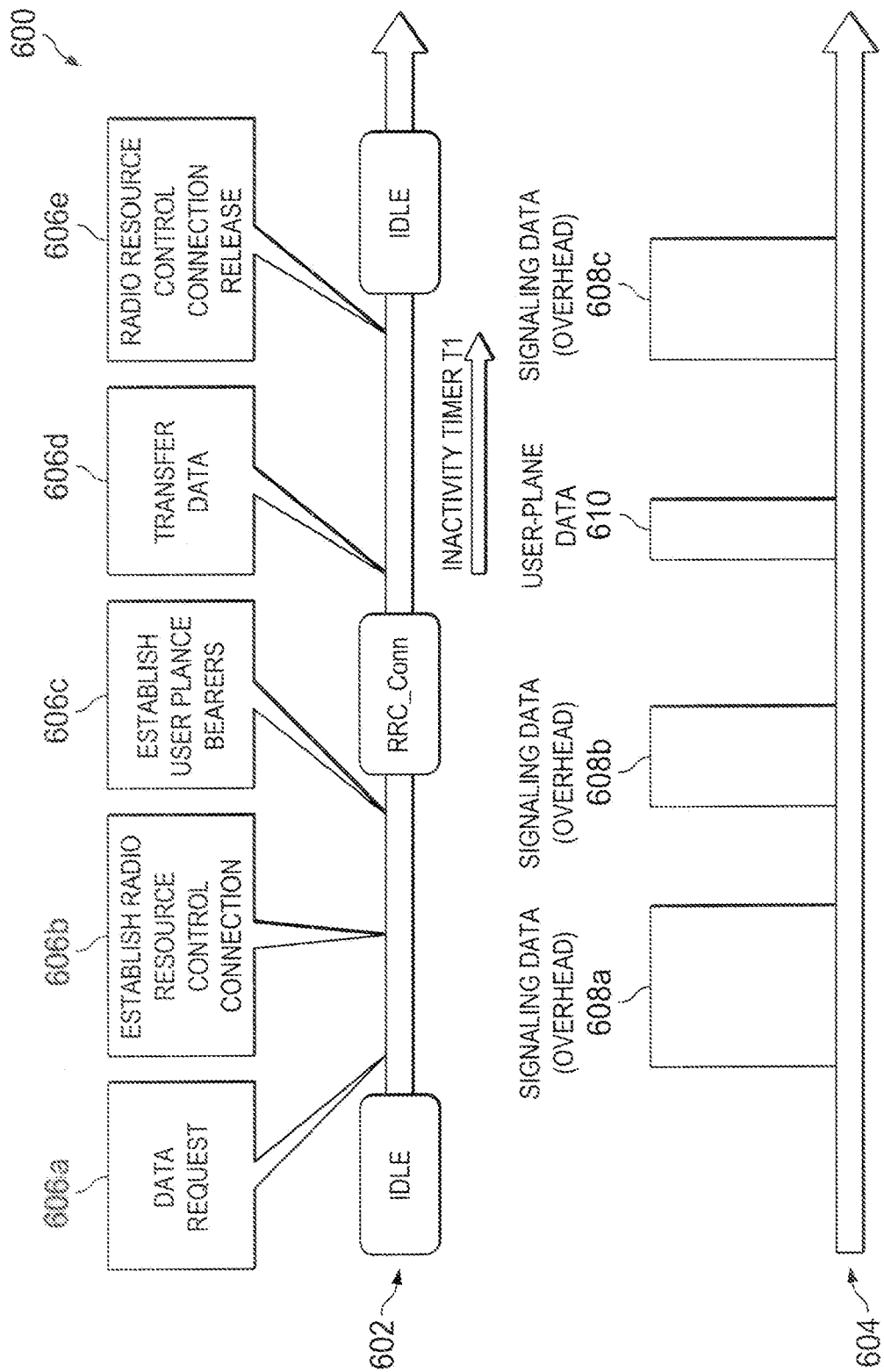
FIG. 5 shows a schematic diagram illustrating signaling and associated actions.

FIG. 5 is a schematic diagram 600 illustrating signaling when switching between RCC idle mode and RRC Connected Mode. In particular, diagram 600 includes flow diagram 602 and 604. The flow diagram 602 indicates occurrences of actions 606a-c (e.g., data request, data transfer, release) during the switching, and the flow diagram 604 indicates signaling 608a-c and 610 that occurs during the executed actions 606a-e. In the presence of smartphone or similar traffic sources, one result of the call-oriented model as discussed above may be that transitions between RRC idle mode and RRC connected mode occur for each of a plurality of small or short data transfers. In this situation, the associated signaling overheads 608a-c used to establish and release the RRC connection (and associated radio and network bearers) for each small or short data session may be large in comparison to the actual volume of user data 610 transferred. Each such transition may involve a significant signaling exchange 608a-c, not only between the mobile and the radio access network, but also between nodes of the radio access network and/or core network. The signaling 608a-c may reduce the efficiency of the system if RRC state transitions occur frequently. For example, even periodic keep-alive signaling, which may consist of only a few bytes of user-plane data, may use a large amount of signaling overhead before and after its transmission if the UE is returned to idle state in between each keep-alive message. As illustrated, the proportion of signaling traffic 608a-c to user-plane data traffic 610 is significantly larger so the system efficiency may be relatively low.

In light of the signaling overheads and associated system resources that can be consumed during the call-oriented model (first approach), the second approach may become increasingly attractive for deployments of networks that support a large population of smartphone devices. However, the efficiency of the second approach may depend on the system design in order that UE power consumption is comparable to that of the RRC Idle Mode.

Figure 6:
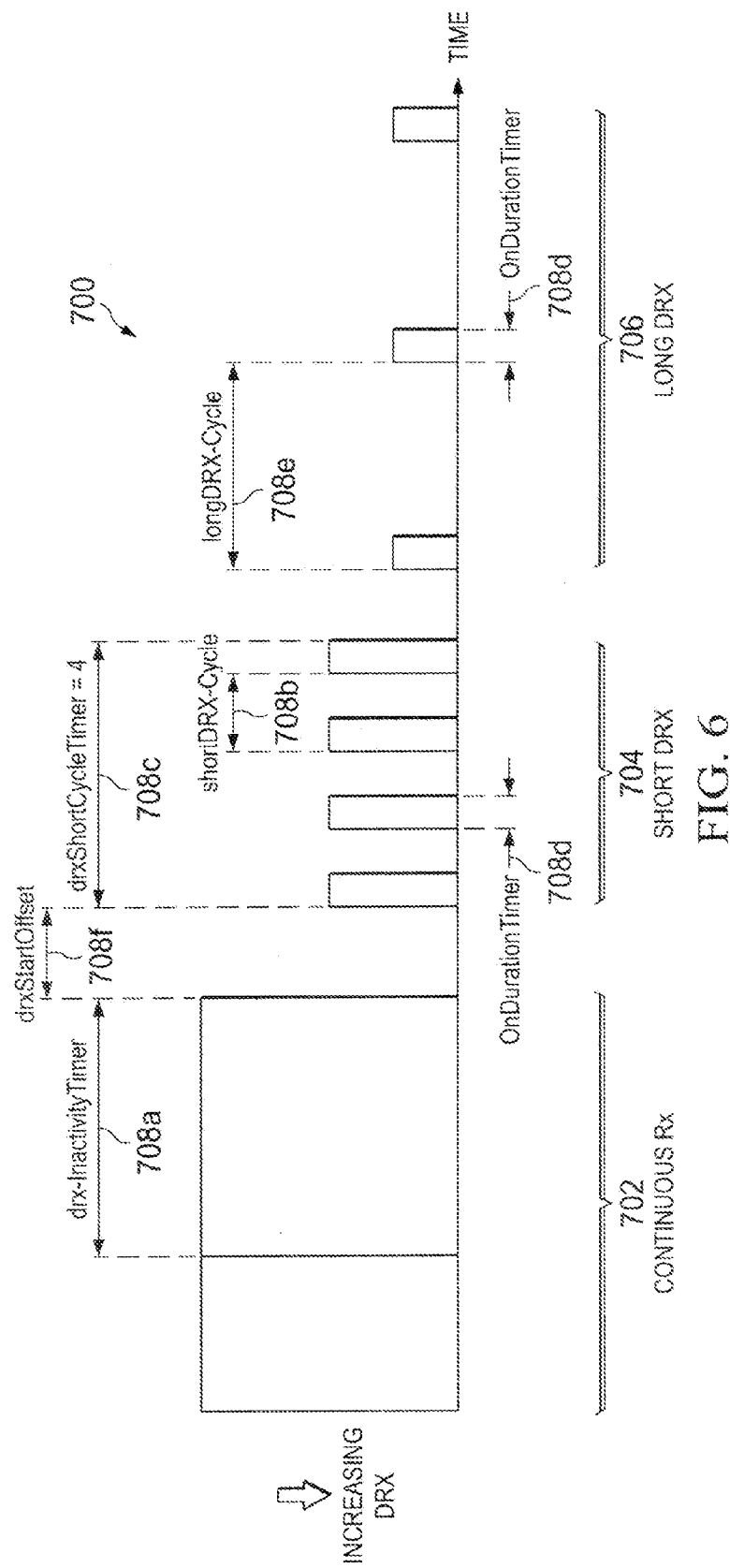
FIG. 6 shows different reception patterns.

FIG. 6 is a schematic diagram 700 illustrating the different reception patterns and associated parameters. In particular, the diagram 700 includes the Continuous Rx 702, short DRX 704, and Long DRX 706. Within RRC Connected Mode, the DRX reception patterns 702 and 704 (defined at the sub-frame level in the time domain) may be controlled by the network assigning various timers and parameters to the UE. The following parameters, defined in 3GPP technical specification 36.321, may determine the DRX patterns 704 and 706: drx-InactivityTimer 708a; shortDRX-Cycle 708b; drx-ShortCycleTimer 708c; onDurationTimer 708d; longDRX-Cycle 708e; drxStartOffset 708f; and/or others. The drx-InactivityTimer parameter 708a is the time the UE remains in continuous-Rx mode after reception of the last new packet (in FIG. 7 only a single data packet is assumed to exist, located at the start of the continuous Rx portion of time). The short-DRX-Cycle 708b parameter is the fundamental period of the short DRX pattern/duty-cycle. The drxShortCycleTimer parameter 708c is the number of fundamental periods of the short DRX cycle that the UE will remain in short DRX for (if inactivity continues) before transitioning to Long DRX. The onDurationTimer parameter 708d is the number of sub-frames for which the UE is "awake" at the start of each DRX cycle fundamental period. The longDRX-Cycle parameter 708e is the fundamental period of the long DRX pattern/duty-cycle. The drxStartOffset parameter 708f defines the sub-frame offset for the start of the DRX cycle patterns in short and long DRX. The total length of time that a UE will remain in short DRX when inactive is equal to (shortDRX-Cycle*drxShortCycleTimer) ms.

The use of a non-continuous reception pattern, such as created by the use of DRX patterns, may result in increased latency due to delaying (or buffering) of transmission of a packet to the UE whilst it is not actively receiving. A trade-off may exist between latency and battery efficiency: continuous reception, high battery consumption, low latency; short DRX, medium battery consumption, medium latency; and long DRX, low battery consumption, high latency.

During times of more intense data activity, the continuous reception MAC sub-state may be used. During times of more intense data activity, more advanced radio transmission and reception techniques are often employed or provide benefits. Many advanced transmission techniques may use the support of physical layer-related control signals to dynamically adapt to the radio environment or radio propagation channel. A mobile radio channel between a transmitting and a receiving antenna may experience a wide fluctuation in signal and/or interference power over temporal, spatial and frequency domains. Such variations may result from the linear superposition of multiple time-delayed copies of a signal that can occur due to the presence of one or more electromagnetically-reflective objects within the environment. Differences in the propagation delay between a direct path and one or more reflected paths may give rise to the relative time shifts in the signal and constructive or destructive interference results as a function of their relative phases and amplitudes. To reduce signal fluctuations (known as fast-fading), modern radio systems may execute numerous feed-forward and/or feedback channel-adaptive techniques. To assist with this, information on the current channel state or radio conditions may be fed back from a receiving unit to a transmitting unit using physical layer control signaling or may be inferred by the transmitting unit using physical layer reference or sounding signals transmitted by the intended receiving unit. Such techniques may include one or more of the following: power control; Adaptive modulation and coding (AMC); ARQ; MIMO; Frequency Selective Scheduling (FSS); and/or others. Power control includes adjustment of the transmission power in opposition to the radio channel amplitude or signal to noise plus interference (SNIR) ratio. Adaptive Modulation and Coding (AMC) includes adjustment of the modulation and coding level in response to the radio channel amplitude or SNIR (more robust coding and modulation schemes for more severe radio conditions). ARQ includes selective retransmission of erroneously-received data blocks. MIMO includes communication of data using multiple transmitting and multiple receiving antennas. By exploiting differences across the plurality of radio channels, the system may either combat radio channel fluctuations to improve robustness, or may increase the volume of data carried via spatial multiplexing of multiple data streams or layers within the same physical radio resource. Frequency Selective Scheduling (FSS) may attempt to exploit a channel response that may vary significantly across the system bandwidth at any instant in time. With frequency selective scheduling, the base station attempts to track these changes and to schedule a UE in those frequency resources that are currently experiencing favorable radio conditions. When applied to the downlink, this relies on frequency-specific channel quality feedback from the UE. When applied to the uplink, the base station may instruct the UE to transmit a wideband sounding signal that enables the base station scheduler to determine which localized frequency resources are currently favorable.

Each of the above techniques may be able to offer an improvement in the underlying spectral efficiency of the data communication at the expense of some signaling overhead for the physical layer control signals needed to support the advanced communication scheme. The increased spectral efficiency for the advanced data transmission scheme may outweigh the signaling overhead, which is easier to achieve for larger quantities of data. For smaller quantities of data or lower activity levels, advanced transmission mechanisms may not justify the expense of the required physical layer control signaling and more basic forms of data transmission may be employed.

In the context of the LTE system, the above-listed advanced communication methods may use associated physical layer control signals or feedback as are detailed in Table 1 below.

TABLE 1

Examples of Physical Layer Feedback in LTE

| Advanced Transmission Scheme or Feature | Physical Layer Control Signal Requirement | Comments/Purpose |
|---|---|---|
| Power Control | TPC | Transmit Power Control commands, such as binary "up/down" indications |
| AMC | CQI | Channel Quality Indication (signals to the transmitting side the modulation and coding scheme that may be currently supported at a given target error reliability) |
| ARQ | ACK/NACK | Positive or negative acknowledgements indicating whether or not a particular data block was correctly received |
| MIMO | PMI/RI | Precoder Matrix Indication*/Rank Indication (information assisting the transmitting side as to how many layers may be spatially multiplexed and which precoding weights to apply) |
| Frequency Selective Scheduling | CQI (for downlink) SRS (for uplink) | Frequency-local CQI reports fed back from the UE to the eNB allow the scheduler to identify those frequency resources that are currently favourable for the UE on downlink. For uplink, the base station may instruct the UE to transmit Sounding Reference Signals that enable the frequency response of the uplink channel to be estimated such that frequency resources that are currently favourable for the UE on uplink may be allocated. |

*for codebook-based MIMO schemes only

When the advanced transmission scheme is applied to the downlink of the radio communications system (from eNB to UE), the feedback types of Table 1 may be sent in the uplink direction (from UE to eNB). The eNB may use the fed-back information or sounding measurements to adapt characteristics of the downlink transmissions to the UE or to send adjustment or control commands to the UE in order to affect the UE's uplink transmission characteristics such as timing, transmit power and so on. Specifically, the possible uplink control information (UCI) types in the existing LTE system may include: CQI (Channel Quality Indication); PMI (Precoding Matrix Information); RI (Rank Indication); DSR (Dedicated Scheduling Request); SRS (Sounding Reference Signal); and/or others. The UCI transmissions require an assignment of physical radio resource (e.g. time/frequency/code) on which they may be transmitted.

The LTE system utilizes an orthogonal uplink multiple access scheme termed Single Carrier Frequency Division Multiplexing (SC-FDMA). The LTE uplink comprises three fundamental physical channels: PUSCH; PUCCH; PRACH; and/or others. The PUSCH (Physical Uplink Shared Channel) is allocated dynamically to users within the cell by the eNB scheduler via its transmission of uplink grants on a Physical Downlink Control Channel (or PDCCH). The PUCCH (The Physical Uplink Control Channel) comprises frequency resources at the upper and lower ends of the system bandwidth. Resources for a given UE on PUCCH are either semi-statically assigned by the eNB via RRC signaling, or for some purposes are implicitly allocated by the presence and location of a PDCCH (for example, HARQ ACK/NACK feedback for a downlink allocation may be sent on part of a shared pool of PUCCH resources, the specific portion used being associated with the location of the PDCCH). PUCCH may be used to send one or more of the following control information fields: CQI, dedicated scheduling request (DSR), PMI/RI, HARQ ACK/NACK. The PRACH (Physical Random Access Channel) comprises time and frequency resources set aside within the system for the purposes of receiving random-access (Aloha) preamble transmissions from UEs within the cell. In addition to the above physical channel types, there are also two uplink physical signals: DMRS and SRS. The DMRS (Demodulation Reference Signals) are embedded (time division multiplexed) into PUSCH and PUCCH transmissions to enable the receiver to estimate the radio channel through which the PUSCH or PUCCH has passed and to thereby facilitate demodulation. The SRS (Sounding Reference Signals) are also time division multiplexed (from the UE perspective) with other uplink physical channels and physical signals. SRS may be used by the base station to support a variety of radio link maintenance and control features, such as the above-mentioned frequency selective scheduling technique, radio link timing control, power control, and/or others.

Figure 7:
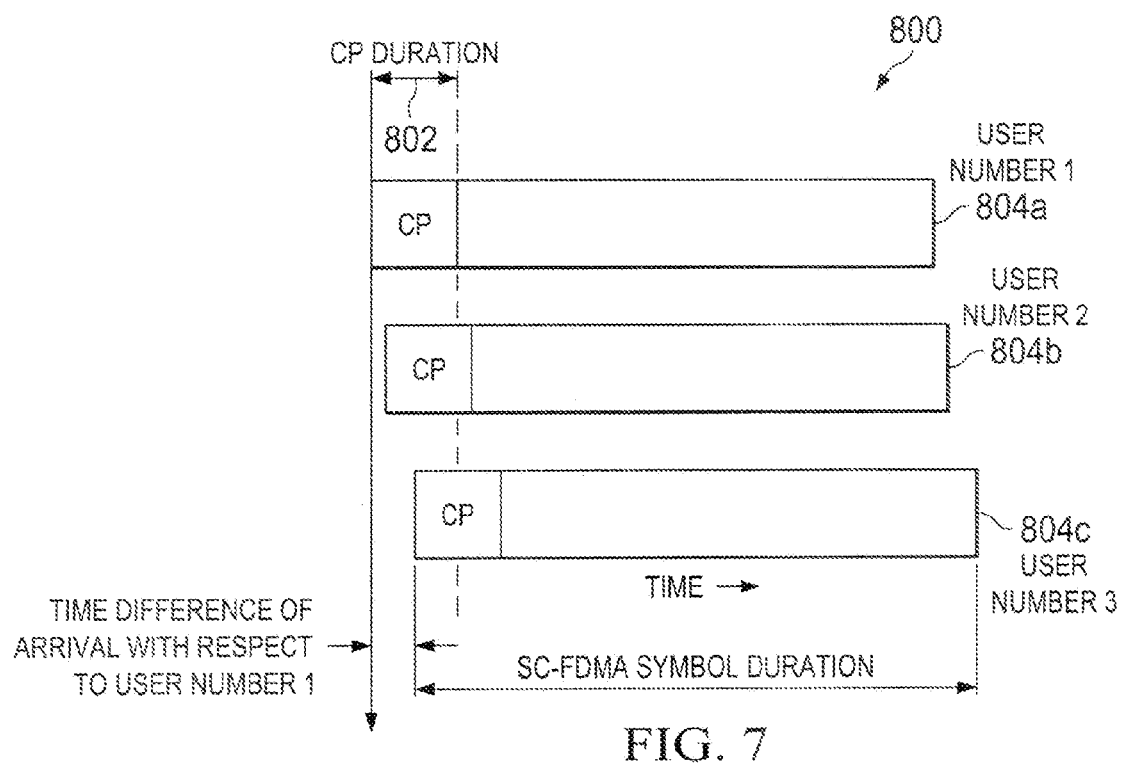
FIG. 7 shows signals including cyclic prefixes.

FIG. 7 illustrates a schematic diagram 800 indicating time alignment of multiple access SC-FDMA signals in the uplink of LTE. Accurate timing control may be executed for the LTE uplink to time-align transmissions from multiple users such that they arrive at the base station receiver within a short time window known as the cyclic prefix (CP) duration 802. At the UE transmitters, each SC-FDMA symbol may be prefixed with a short cyclic signal portion (taken from the end of the symbol) in order to facilitate efficient frequency domain equalization techniques at the receiver. In the uplink multiple access case, the signals may be time-aligned at the eNB receiver within the CP duration in order that user frequency-domain orthogonality may be preserved. Diagram 800 shows multiple SC-FDMA signals 804a-c arriving at a base station from three different users wherein their time difference of arrival falls within the CP duration.

The eNB may control the transmission timing of UEs such that timing alignment of multiple user transmissions at the eNB receiver within a particular time-window may be achieved. This timing alignment may be accomplished using measurement of timing error at the eNB receiver for each user, and the subsequent transmission of closed-loop timing adjustment commands from the eNB to each UE. The UE may adjust transmission timing in accordance with the commands to reduce the timing error.

An absence of timing alignment may cause significant interference to other uplink users (i.e., a loss of uplink orthogonality of the multiple access scheme). For this reason, users may not transmit on orthogonal uplink resources (PUCCH, PUSCH, and DMRS, SRS) until timing alignment has first been established. This alignment may be achieved using transmission of a non-timing-aligned preamble on the PRACH (the PRACH may not be an orthogonal resource). The eNB may measure the time of arrival error of the UE's PRACH transmission and sends a timing adjustment command that may bring the UE into alignment with other uplink users. Once completed, the eNB may then consider that the time-aligned UE is permitted to use orthogonal uplink resources such as PUCCH, PUSCH and SRS.

To maintain timing alignment, ongoing timing adjustment commands may be sent by the eNB. These commands may be sent as determined by the eNB or a periodic update methodology may be implemented by the eNB. Each time a timing command is sent on the downlink to the UE, the UE may restart a timer known as the "Timing Alignment Timer" or TAT. The TAT increments in time until being restarted due to the arrival of a new timing command. If the TAT reaches a certain threshold value (i.e., the timer "expires"), the UE may be out of synchronization and no longer transmit on orthogonal uplink resources. The eNB may also mirror this timer for each UE and may be aware when each UE is out of synchronization. In this case, the eNB determines that PUSCH grants of uplink shared channel resource cannot be fulfilled without prior reiteration of the PRACH timing alignment procedure.

The TAT may also expire while longer-term (or semi-static) uplink resources (such as periodic PUCCH resource for CQI or periodic resources for SRS) are assigned to the UE. If present, such resources may have been previously assigned via RRC signaling (e.g., at the start of a period of activity). In this event, the 3GPP LTE standard mandates that (on TAT expiry), the UE may release all pre-assigned PUCCH and SRS resources. A relevant extract of procedural text from 3GPP TS 36.321 is "when timeAlignmentTimer expires: flush all HARQ buffers; notify RRC to release PUCCH/SRS; and clear any configured downlink assignments and uplink grants." PUCCH or SRS resources may also be released via the use of explicit RRC signaling via an RRC reconfiguration.

Figure 8:
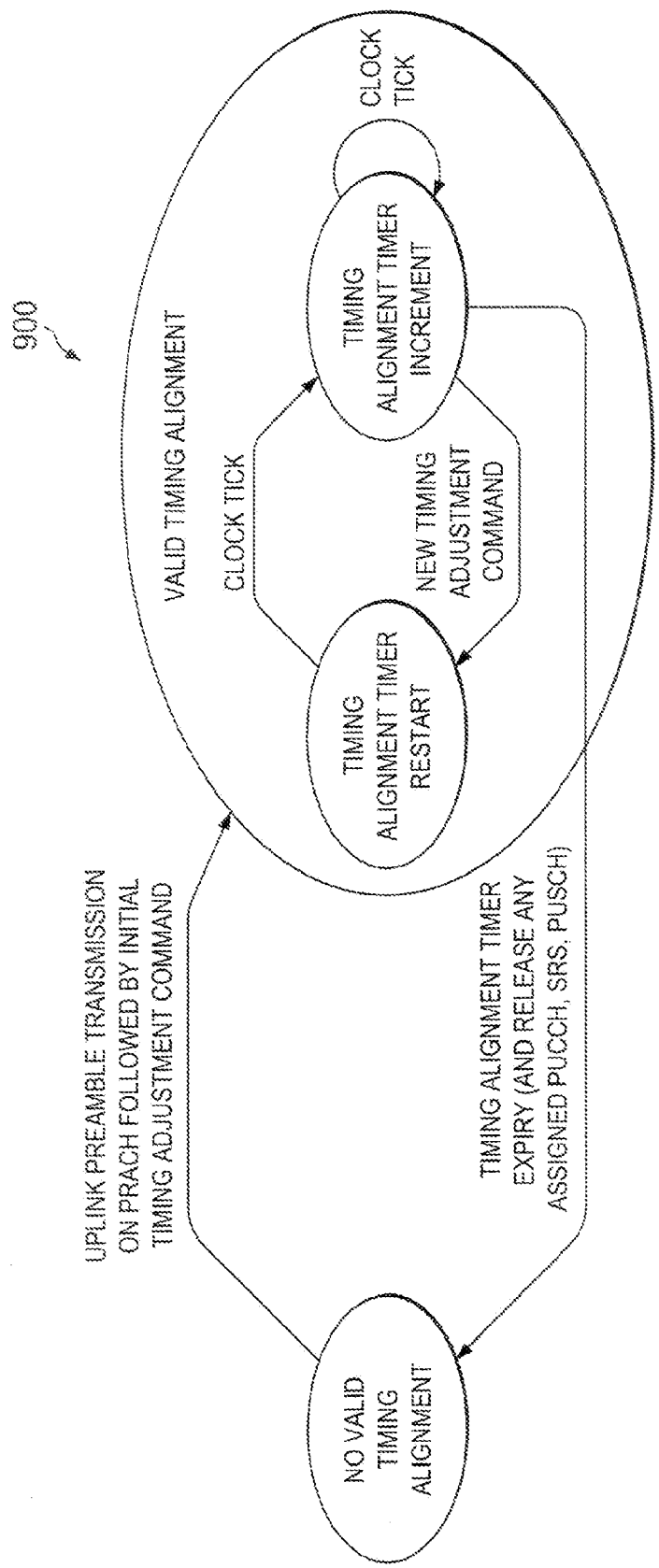
FIG. 8 shows timing alignment between wireless devices and nodes.

FIG. 8 is a schematic diagram 900 illustrating an overview of the timing alignment sub-states as maintained, in some implementations, synchronously by eNB and UE. The expiry threshold for the TAT may be a configurable value which is communicated to the UE. The value may be set and controlled by the eNB and may be defined in Release 8 of the 3GPP standard to be one from the set of {0.5, 0.75, 1.28, 1.92, 2.56, 5.12, 10.24 and Infinity} seconds.

In some implementations, a particular transmission timing may be valid while the relative distance between the eNB and UE remains approximately the same. The timing adjustment may accommodate for twice the propagation delay between the UE and the base station. As the UE moves relative to the eNB (most notably in a radial direction towards or away from the eNB), the propagation delay may also change and the UE's timing may be updated. The rate at which the timing may be updated (or similarly, the length of time for which a particular transmission timing remains valid) may be a function of both the direction and speed of travel.

By means of example, a signal received from a UE travelling at 120 km/h in a radial direction directly away from the eNB may undergo a time shift (retardation) of 0.222 µs per second of travel. Timing adjustments may be executed when the timing error reaches approximately +/−1 µs (as this constitutes a reasonable percentage—~20%—of the total cyclic prefix window). Thus, an adjustment of once per 5 seconds may be executed for the considered scenario of 120 km/h. The TAT expiry threshold may then be set to a value similar to this, such as the 5.12 second value above in such a case.

Thus, in cells expecting to service high mobility devices (such as those close to motorways or high speed rail links), the TAT expiry threshold may be set to a short value (approximately 1 or 2 seconds). Whereas, in smaller cells or cells expecting to service only devices traveling at pedestrian speeds, the TAT expiry threshold may be set to a relatively large value (such as one or two minutes). The current use of a limited set of quantized values for the TAT expiry threshold may not allow for settings of one or two minutes, and a value of either 10.24 seconds or Infinity must instead be selected.

The use of the SC-FDMA orthogonal uplink multiple access scheme in LTE implies that users transmitting within the same cell may be each assigned separable resources such that, to a large extent, may not interfere with each other's transmission. The assigned separable uplink radio resources, (in terms of time/frequency/code), may be made available by the eNB for the UCI transmissions. Two primary mechanisms for assigning resources for UCI in LTE may include Semi-static assignment of periodic resources (accomplished via RRC signaling) or dynamic assignment of "single-shot" (or "aperiodic") resources (accomplished via MAC and physical layer grant mechanisms). Both methods apply only for devices in RRC connected mode. In Release-8/9 of the 3GPP specifications, methods applicable for each of the UCI types are shown in Table 2 below.

TABLE 2

Applicability of uplink resource allocation methods to uplink control signal types in LTE Release 8/9

| UCI Type | UL Resources | Comments |
| --- | --- | --- |
| CQI/PMI/RI | Periodic or aperiodic | Periodic PUCCH resources assigned via RRC Aperiodic assigned via PUSCH grant and bit set to indicate that a CQI/PMI/RI report should be returned |
| DSR | Periodic only | Periodic PUCCH resource assigned via RRC |
| SRS | Periodic only | Periodic SRS resource assigned via RRC |

While aperiodic assignments may better optimize the use of UL resources (as they may be assigned dynamically as a function of need), associated overheads may be generated due to the fact that in order to assign the UL resources (PUSCH), a corresponding UL grant must be sent in the downlink direction (on PDCCH) for each assignment. This may not be problematic if an UL grant of PUSCH resource was in any case to be assigned for the purposes of user data transfer, in which case the UCI control signaling may 'piggyback' the same uplink (PUSCH) transmission and a separate grant for UCI control data is not required.

However, when uplink data is not ongoing, and when it remains desirable to update channel conditions for DL channel tracking purposes, the PUSCH grants on DL PDCCH may represent an additional overhead as each must be granted explicitly for UCI transmission (i.e., no piggybacking of CQI/PMI/RI on existing PUSCH grants for other UL data is possible). The use of periodic assignments may reduce the signaling burden (as the resources are configured only occasionally), but long-term reservation of periodic UL resource for a particular UE may be wasteful of system radio resources when they are allocated to less active devices. In these cases, the resources may be assigned but may not be used, or are not used to good effect. Signaling load may be a key element for consideration when deriving a strategy for the assignment of uplink control resources in LTE.

Referring again to the first approach or the "call-oriented" model, when using periodic resources for UCI and on commencement of activity, the network may transition the UE from Idle to RRC connected mode and may additionally configure specific periodic uplink resources for CQI/PMI/RI, DSR and SRS. These are typically configured for the duration of the UE's stay in connected mode (until sufficient inactivity warrants transition back to idle), or until the UE's timing alignment timer (TAT) expires (in which case all of the periodic resources are released as the UE is no longer able to partake in orthogonal uplink multiple access).

The periodic resources may also remain configured whilst various DRX sub-states are used (continuous reception, short and long DRX). When in long and short DRX, the periodic transmission pattern of UCI types may be 'gated' by the DRX pattern associated with that DRX sub-state. If the on-periods of the periodic UCI assignment pattern and the DRX patterns are in some way aligned, this means that UL control signals may be transmitted during short and long DRX sub-states. If they are not aligned, no transmission of UCI may take place in certain DRX sub-states. In continuous Rx mode, the transmission of uplink control signals may be determined solely by the assigned periodic UCI pattern(s), since the DRX pattern in that case may always be "on".

In Release 9 of the 3GPP specification, a feature (named "CQI masking") optionally permits, if configured by the network, the UE to also gate transmission of the uplink control signals according to one of the short or long DRX patterns even when in continuous reception mode. This feature may provide an easy or simplistic method for the network to configure and control sharing of UL control resources between connected mode UEs by means of DRX pattern assignment, notably without the need to rely on the details of the periodic UCI configurations of each UE for multiplexing uplink control information from multiple users. This is because with CQI masking enabled, the DRX gating pattern applies not only to UCI transmissions in short/long DRX modes but also to UCI transmissions in continuous Rx mode.

The CQI-masking feature may align the periodic UL resource assignments in some way with the DRX patterns such that uplink control feedback is still transmitted during short/long DRX. The periodic UCI resources may be released when dictated by the network (using explicit dedicated RRC signaling to do so) or via TAT expiry. Under the aforementioned second approach, the continued presence of dedicated periodic UCI resources for UEs being held in RRC Connected mode for a prolonged period may not be appropriate and may cause significant power drain for the mobile device. Therefore, the existing mechanisms to control the assignment of periodic UCI resources suffer from the following potential disadvantages: (1) excessive signaling overheads for the call-oriented model (first approach); and (2) continued transmission of UCI during long DRX may not be appropriate for the second approach. In Releases 8 and 9 of the 3GPP standard, SRS transmissions may be placed on periodic resources assigned semi-statically by the base station. The resources used normally overlap with PUSCH/PUCCH and so short gaps in PUSCH/PUCCH may be created to accommodate transmission of SRS without such overlap. SRS resources may effectively "puncture" some SC-FDMA symbols within the PUSCH/PUCCH resource space.

Figure 9:
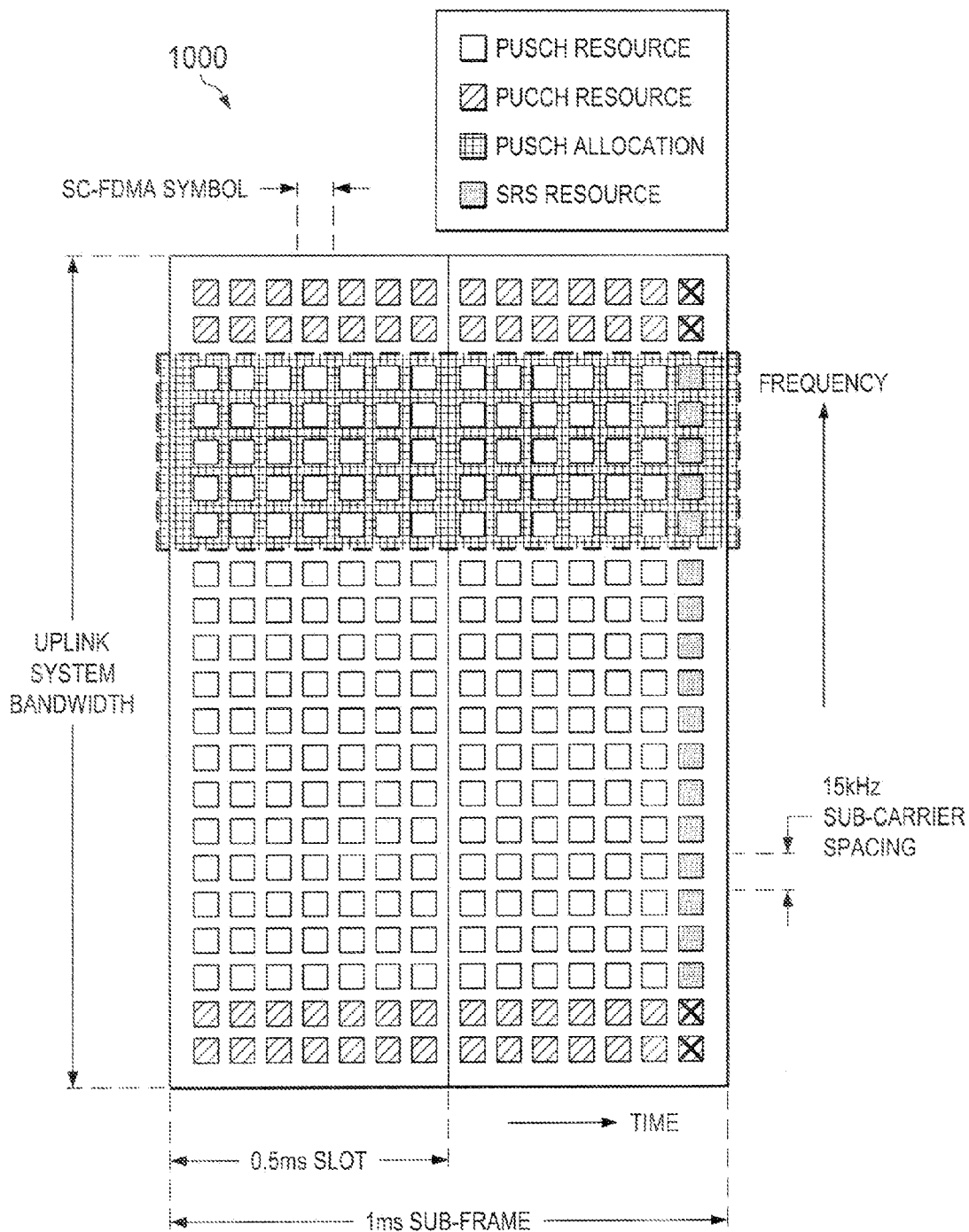
FIG. 9 shows a diagram of an example allocation of PUSCH, PUCCH and SRS resources in the time/frequency domain within an LTE uplink system bandwidth.

FIG. 9 shows a diagram 1000 of an example allocation of PUSCH, PUCCH and SRS resources in the time/frequency domain within an LTE uplink system bandwidth. The diagram 1000 shows the particular case of a sub-frame with SRS present (in which case it is located on the last SC-FDMA symbol of the sub-frame). Note that SRS may not be present in each sub-frame and its configuration may be under the control of the eNB. When SRS is not present or configured, the last symbol within the sub-frame may instead be available for PUSCH or PUCCH transmission. In Releases 8 and 9 of the 3GPP LTE standard, simultaneous transmission of PUCCH and SRS may be not permitted in order to preserve the single-carrier property of the uplink waveform. Hence, when SRS is transmitted, the corresponding PUCCH signal within the same SC-FDMA symbol may not transmitted. Furthermore, simultaneous transmission of PUCCH and PUSCH may also not be permitted in Releases 8 and 9 of the standard. For the PUSCH allocation shown, and if SRS transmission is configured for the sub-frame, none of the UEs in the cell may transmit PUSCH on the last SC-FDMA symbol of the sub-frame to allow for reception of SRS without intra-cell interference. The SRS resources shown within the sub-frame are typically further sub-divided amongst multiple simultaneous users via frequency and code division multiplexing techniques. Time division multiplexing may also be used over multiple sub-frames to provide additional user multiplexing flexibility (periodically transmitted SRS).

Figure 10:
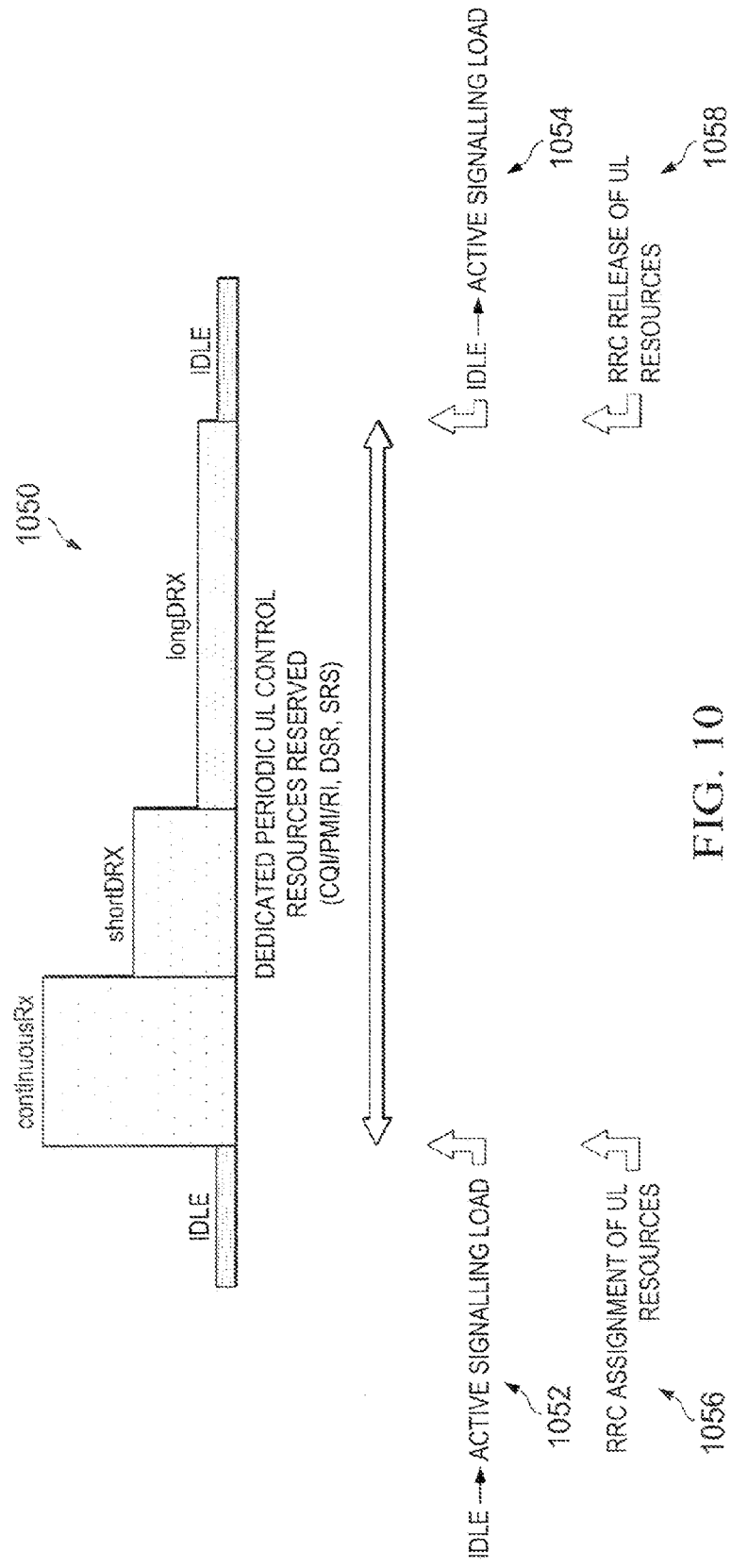
FIG. 10 illustrates a schematic diagram indicating an implicit release of resources associated with a DRX transition.

FIG. 10 illustrates a schematic diagram 1050 indicating a transition from Idle to RRC connected, and back to Idle in an existing LTE system. In particular, the diagram 1050 illustrates an assignment of periodic uplink control resources for the duration of time within the RRC Connected Mode state. The resources remain configured and assigned to the UE irrespective of the DRX sub-state currently in use within the RRC Connected mode. RRC signaling message 1052 is used to transition the UE from Idle to RRC Connected mode. RRC signaling message 1054 is used to transition the UE from RRC Connected mode back to Idle. RRC signaling message 1056 is used to explicitly assign the periodic uplink control resources to the UE. RRC signaling message 1058 is used to explicitly release the periodic uplink control resources to the UE. In some implementations, signaling messages 1052 and 1056 may be combined within a single signaling message. In some implementations, signaling messages 1054 and 1058 may be combined within a single signaling message.

Figure 11:
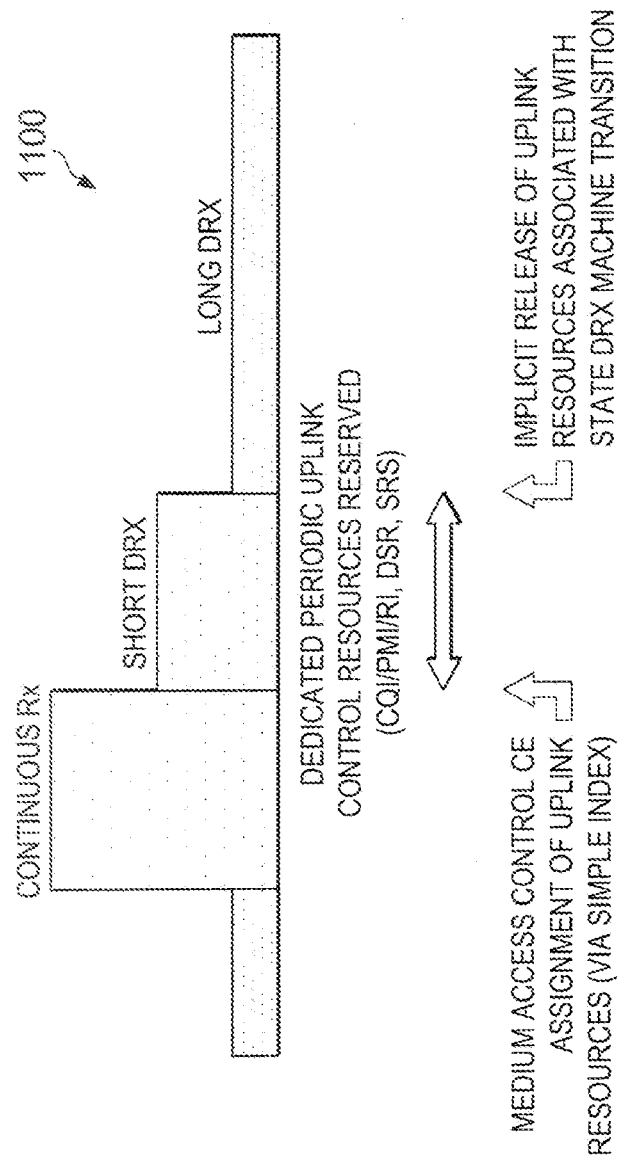
FIG. 11 is a flow chart illustrating an example method for implicitly releasing resources based on a DRX cycle.

FIG. 11 illustrates a schematic diagram 1100 indicating an improved scheme comprising the following differences to FIG. 10. In a first difference, during the period of time shown, the UE is not transitioned to or from idle and instead the UE remains in the RRC connected mode. Thus, messages equivalent to those of message 1052 and message 1054 from FIG. 10 are not required during the time period shown in FIG. 11. In a second difference, message 1102 substitutes message 1056 from FIG. 10 and comprises a message or command containing an assignment of periodic uplink control resources. The assignment is conveyed using a simple resource index value within message 1102. The message or command containing the assignment may be a MAC Control Element (CE) command, as shown in FIG. 11, or may be a physical layer command such as may be sent on a PDCCH. Message 1102 may alternatively comprise a physical layer command such as may be sent on a PDCCH. In a third difference, the assigned periodic uplink resources are implicitly (i.e., automatically) released at a time associated with a DRX sub-state transition, DRX timer expiry or other change that causes a reconfiguration of DRX parameters or timers, thereby obviating the need for any message or equivalent thereof corresponding to message 1058 in FIG. 10. In other words, the resources may be released independent of explicitly signaling identifying the release. For example, the eNB may implicitly release the resources when an UE transitions from continuous reception sub-state to short DRX sub-state or from short DRX sub-state to long DRX sub-state. In other words, the eNB may not release the resource attributes until the UE transitions from the short to the long DRX sub-state. An implicit release of a resource means that either the network releases the resource without explicit communication with the other. As previously mentioned, the DRX timer executed by the UE and the eNB may be synchronized, and, in these implementations, the UE may determine when the eNB releases the allocated resources without receiving explicit signaling. For example, in response to the DRX expiry, the UE may update or otherwise identify the allocated attributes as nulled by the eNB. In these instances, the UE may use the previously-assigned attributes in subsequent access to wireless resources. For example, in response to a request for subsequent use of resource attributes from the UE, the eNB may determine that the previously-assigned configuration is available and not transmit a different identifier. In these instances, the UE may determine that if a signal is not received within a certain period of time that the previously-assigned attributes are now active and update the status accordingly. Alternatively, the eNB may transmit an identifier message set to null or any predetermined value defined to mean that the previously-allocated identifier is currently allocated. If not available, the eNB may transmit a second identifier allocating different resource attributes. After the eNB releases the subsequent attributes, the eNB may execute this resource loop again of assigning attributes using identifiers, implicitly releasing the attributes, and assigning subsequent attributes (either the previously-assigned or different attributes).

Thus, in a fourth difference, diagram 1100 illustrates that the assigned periodic uplink control resources are assigned to the UE only for a time portion of the RRC Connected mode stay, for example, the time portion corresponding to the period of time during which the continuous Rx DRX sub-state mode is active. While not illustrated, the periodic resources may alternatively or additionally be assigned for a portion (or an entirety) of a length of stay within a short or long DRX sub-state. For example, a UE and eNodeB may implicitly release assigned resources in response to at least a transition between the short DRX cycle and the long DRX cycle, or in response to a transition between continuous Rx and short or long DRX. The implicit release of the uplink resources need not occur at exactly the same time as the DRX sub-state transition that triggered the release, but may more generally occur upon the expiry of a timer which is linked to the triggering DRX sub-state transition and expires sometime thereafter.

Alternatively, (and also not illustrated), an explicit message may be sent by the eNodeB to the UE to indicate that periodic resources are to be released. The message may, for example, be contained within a MAC control element (CE) command, or within a physical layer command such as may be sent on a PDCCH.

Following a release of periodic uplink control resources, a method of allocating new resources for UCI is required should a UE once again resume data activity (and transition to the continuous Rx DRX sub-state). Preferably, such a method should be signaling efficient in order that the signaling overhead burden on the radio access network is minimized and such that the system is able to handle a large number of potentially frequent transitions between the short or long DRX sub-states and the continuous Rx sub-state. Within the current system, UCI resources may only be allocated/reallocated via use of dedicated RRC control signaling (such as message 1056) between the eNodeB and the UE. An example of such a dedicated RRC control message is the RRC Connection Reconfiguration message. Such messages contain a plurality of parameters which are used to specify a further plurality of physical resource attributes, such as periodic time domain transmission patterns, sub-carrier or physical resource block (PRB) frequency resources, and any codes or code parameters assigned in the code domain. Due to the presence of these multiple configuration parameters within the RRC control signaling message 1056, the message may be relatively large and may present a substantive signaling overhead to the radio access network. As such, alternative and more efficient signaling methods for the reallocation of UCI resources is desirable.

In some implementations, the signaling overheads associated with UCI resource reallocation may be substantially reduced via utilization of a resource index identifier in conjunction with a known relationship between the resource index identifier and a resource configuration and a further known relationship between the resource configuration and a set of resource attributes (or resource parameters that describe or relate to the resource attributes). The resource attributes unambiguously describe the resource in terms of its specific time domain, frequency domain and code domain characteristics. In one implementation, it may further be possible that certain time-domain resource attributes are not signaled or associated with the resource identifier, but are instead understood by the UE and eNB to be associated with an existing DRX cycle or DRX status of a DRX sub-state. In this case, the resource identifier may convey only frequency and/or code domain resource attributes. In some implementations, the wireless network may assign each of a plurality of identifiers to a plurality of different resource configurations where each resource configuration includes a plurality of resource attributes. In these instances, the associations between the identifiers, the resource configurations and the resource attributes may be identified via one or more known relationships that may be transmitted to the UE (e.g., broadcast, dedicated signaling) and/or predefined in the UE. In response to a request for radio resources or in connection with the eNB transmitting new data to the UE, the eNB may allocate resource attributes to the UE and transmit the associated identifier to the UE. In these examples, the UE may identify the allocated resources by mapping the identifier to the resource configuration in the known relationship. The UE may then apply the resource configuration, and applying may mean configuring various settings within the MAC and/or physical layer to control transmitting and receiving. In some implementations, the identifier may be mapped directly to the resource attributes independent of mapping initially to a resource configuration. In other words, the UE may identify allocated resource attributes independent of explicit signaling between the UE and the eNB identifying the allocation. In connection with receiving the identifier, the UE may communicate with the wireless sources using the allocated resource attributes. For example, the UE may transmit at least one signal to the wireless network using the allocated resource configuration.

Figure 15:
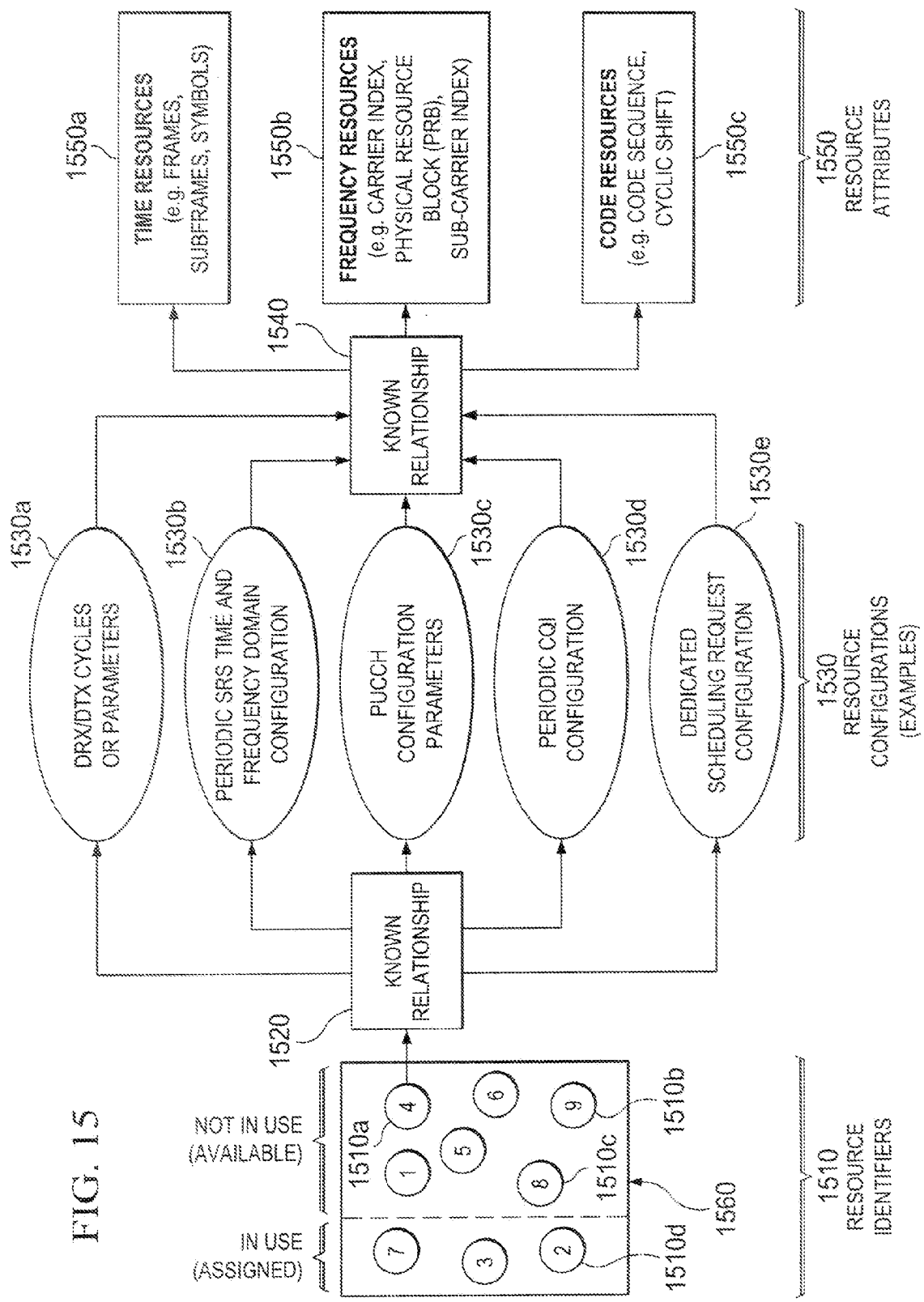
FIG. 15 is a schematic diagram illustrating an example mapping between a resource identifier from within a pool of shared resource identifiers and resource configurations.

FIG. 15 shows an example of a mapping between resource identifier 1510a from within a pool 1560 of shared resource identifiers 1510. In addition to resource identifier 1510a, the pool 1560 of shared resource identifiers comprises a plurality of other resource identifiers including 1510b, 1510c and 1510d. The eNB manages the allocation (or assignment) of resource identifiers to UEs and maintains a list of those that are "in use" (i.e., assigned) and those that are "not in use" (i.e., available for assignment). Each resource identifier may be associated with resource attributes 1550 either directly, or via an intermediate association with one or more resource configurations 1530. The resource attributes 1550 may include any combination of time resources 1550a, frequency resources 1550b and code resources 1550c. The resource configurations may include parameters or configurations associated with particular UCI control types, physical channel types, or DRX cycles. Examples of possible resource configurations are shown, including 1530a, 1530b, 1530c, 1530d, and 1530e. Each resource identifier, such as resource identifier 1510a, may be associated with one or more resource configurations such as 1530a, 1530b, 1530c, 1530d, 1530e via known relationship 1520. The resource configurations such as 1530a, 1530b, 1530c, 1530d, 1530e may be associated with resource attributes 1550a, 1550b and 1550c via known relationship 1540. Alternatively (and not shown), each resource identifier such as resource identifier 1510a may be associated directly with resource attributes 1550a, 1550b and 1550c via a further known relationship (i.e., the intermediate step of associating resource identifiers to resource configurations may not be required or implemented).

The resource identifier may be sent within a message such as a MAC CE command (e.g. message 1102 of FIG. 11), or within a physical layer message such as a PDCCH. The known relationship between each resource identifier and its associate resource attributes may be a direct known relationship or may comprise known relationships 1520 and 1540. The known relationship(s) may be provided via a number of means. In one implementation, a pool 1560 of shared UL control resources can be described within system information and broadcast to all UEs within a cell of the eNodeB. The pool 1560 of UL control resources may be subdivided into a set of (preferably orthogonal) resource configurations, indexed via a resource identifier (1510a, 1510b, 1510c, 1510d, . . . ) for each. For example, a particular physical resource configuration within the pool of UL control resources may be described via a plurality of time domain, frequency domain, code domain or other physical resource attributes 1550 which may be aggregated and assigned a resource identifier.

Other means of providing the known relationship(s) are also possible. The known relationship(s) may be may be derived by one or more of the following methods (or any combination thereof): i) a predefined mapping within the standard or specification using defined rules, equations, or relationships; ii) rules defining the known relationship(s) are signaled via common signaling within the cell, such as on system information; iii) rules defining the known relationship(s) are signaled via dedicated (e.g., RRC) signaling to a UE; iv) an explicit list of the known relationships is signaled via common signaling within the cell; v) an explicit list of the known relationships is signaled via dedicated (e.g., RRC) signaling to a UE.

The uplink resource may relate to PUCCH or SRS resources, and may be used to carry various UCI types including CQI, PMI, RI, DRS, ACK/NACK or sounding reference signals. One or more resource index identifiers may be assigned to a UE, each resource index identifier corresponding to resources to be used for transmission of one or more of the different possible UCI types. Alternatively, a single resource index identifier may be assigned to a UE and which corresponds to an aggregated uplink resource on which one or more of the plurality of UCI types may be transmitted.

On entering the continuous-Rx DRX sub-state (i.e., on resumption of packet activity), a MAC control element (MAC CE) may be transmitted by the network (e.g., eNodeB) to the UE, allocating one or more particular (and available) resource identifier(s). The UE may map the resource identifier(s) to specific resources such as, for example, periodically-occurring time/freq/code resources using the known relationship that has been established a-priori. While in continuous Rx (and possibly also short and/or long DRX), the UE may use the assigned periodic resources for transmission of uplink control data. At a time instant related to a time of exiting continuous Rx (or possibly related to a time of exiting short DRX) due to inactivity, or on receiving an explicit command to do so, the UE and network determine that the assigned short-term periodic resources are released back into the pool of shared resources and are then available for assignment to other connected-mode UEs. The implicit deactivation may occur as a function of other pre-defined or configured timers or parameters and need not be restricted to occurring exactly on a DRX sub-state transition. For example, implicit uplink resource deactivation may be arranged, specified or otherwise configured to occur a certain time after a DRX sub-state transition (e.g., 1 second after entering long DRX) and/or based on other messages, parameters, or events.

The eNB scheduler is responsible for managing and allocating the pool 1560 of UL short-term periodic resources. The use of a MAC CE to assign the resource index is both faster and more efficient than the use of RRC signaling to signal explicit resource parameters. Furthermore, the use of an implicit de-allocation of the resources on exiting continuous-Rx or short DRX avoids the need for any explicit signaling such as in the current RRC-centric approach. Signaling is required only on assignment of the resource index when entering continuous Rx.

In order to minimize or otherwise reduce signaling overhead, the UE may, on re-entering continuous-Rx, assume a default uplink resource configuration if no other uplink resource identifier is explicitly assigned by the network on entering continuous-Rx. In other words, the last-known previously-assigned (and subsequently released) set of uplink resources may be re-used. This default may reduce additional signaling overheads should the previously-released UL resource identifier still be available when the UE re-enters continuous-Rx mode from a DRX state in which UL resources had been de-allocated. Alternatively, the network may indicate explicitly within a signaling message that the UE is allowed to again use the resources associated with the resource identifier most recently signaled to the UE. This signaling message may also be contained within, for example, a MAC CE, or within an RRC message, or within a physical layer message such as may be sent on a PDCCH.

Using an implicit or explicit resource release mechanism may enable multiple UEs to be held in a connected mode state without consumption of long-term periodic UL resources. Resources may be dynamically shared with low-overhead signaling and may be assigned and/or released at times linked to DRX sub-state transitions, which may allow for efficient statistical multiplexing of UL control resources between users as a function of their immediate activity levels. This scheme may address one or more of the following issues in LTE or other suitable network systems: i) the number of connected mode UEs being limited due to long-term dedicated UL control resources being assigned to each UE; ii) excessive signaling loads associated with frequent idle-to-active transitions; iii) large signaling overheads and latencies associated with RRC-based explicit configuration/release of periodic UL control resources; iv) potential DL inefficiencies of aperiodic CQI/PMI/RI using a PUSCH grant for each feedback instance; and/or others.

In some aspects of operation, the eNB identifies a mapping between identifiers and resource configurations detailing a plurality of resources. In some implementations, the eNB may generate the mapping between the identifiers and the resource configurations. In response to a request for radio services or in connection with the eNB transmitting new data to the UE, the eNB allocates a resource configuration from the plurality of configurations to the UE and transmits a resource identifier to the UE identifying the allocated resource. Using the mapping between the identifiers and the resource configurations, the UE identifies and applies the allocated resource configuration. The UE may set parameters and/or timers in accordance with the allocated resource configuration for data transmission to the eNB. Based on a transition from continuous Rx to short DRX (or optionally from short DRX to long DRX), the UE may implicitly release the resource allocation. In addition, the eNB may de-allocate the resource configuration based on data transmission inactivity associated with the UE. In subsequent allocations, the eNB may transmit a new identifier to the UE allocating a new resource configuration or omit transmitting an identifier to indicate that the UE is allocated the previously-allocated identifier. Alternatively, the resource configuration may be released via an explicit communication between the UE and the network. In a further alternative, if the UE determines that there is no further data to transmit, the UE may send an indication message to the network requesting transition to a more battery-efficient state.

Figure 12A:
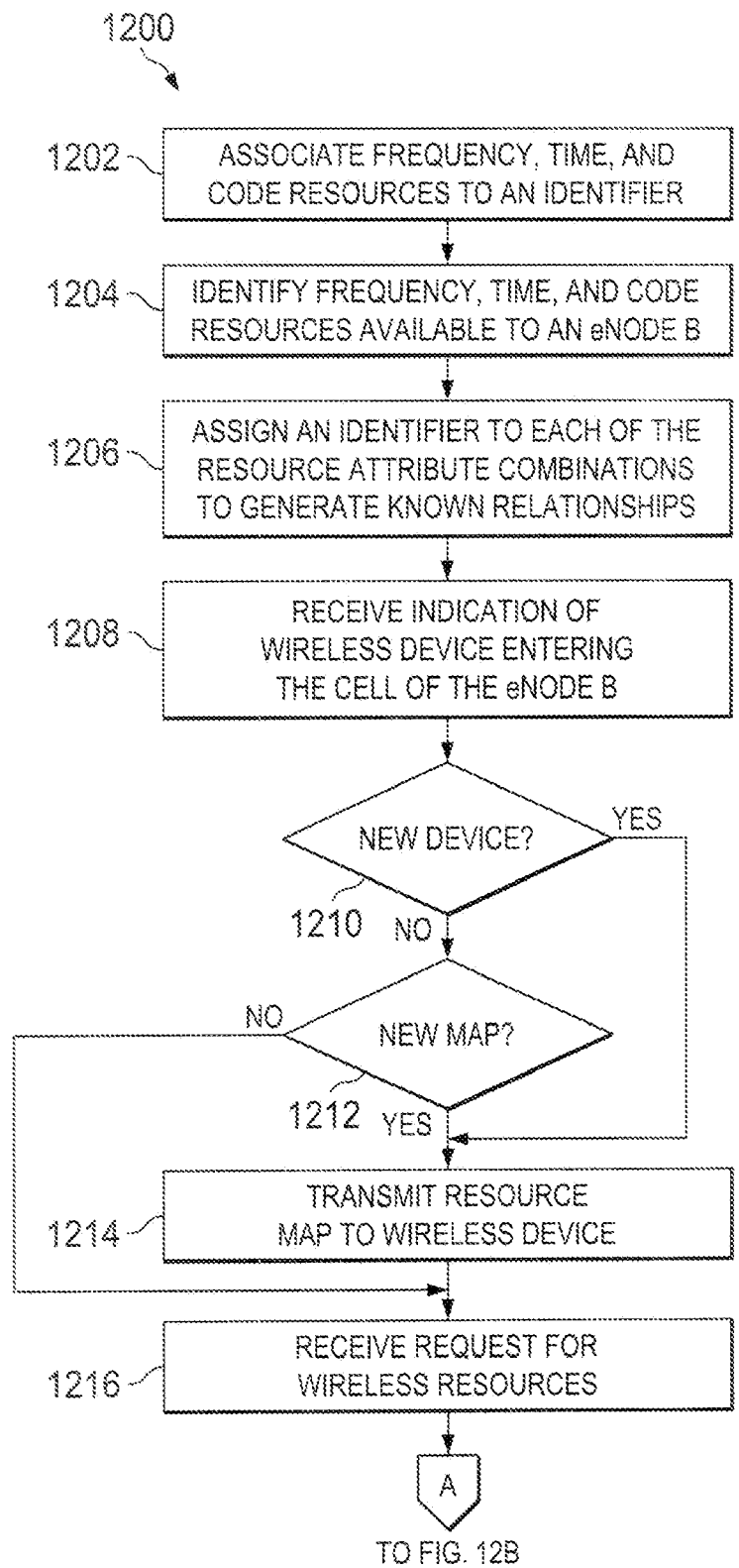
FIGS. 12A-B are a flow chart illustrating an example method for identifying an implicit release of wireless resources based on a DRX cycle.
Figure 12B:
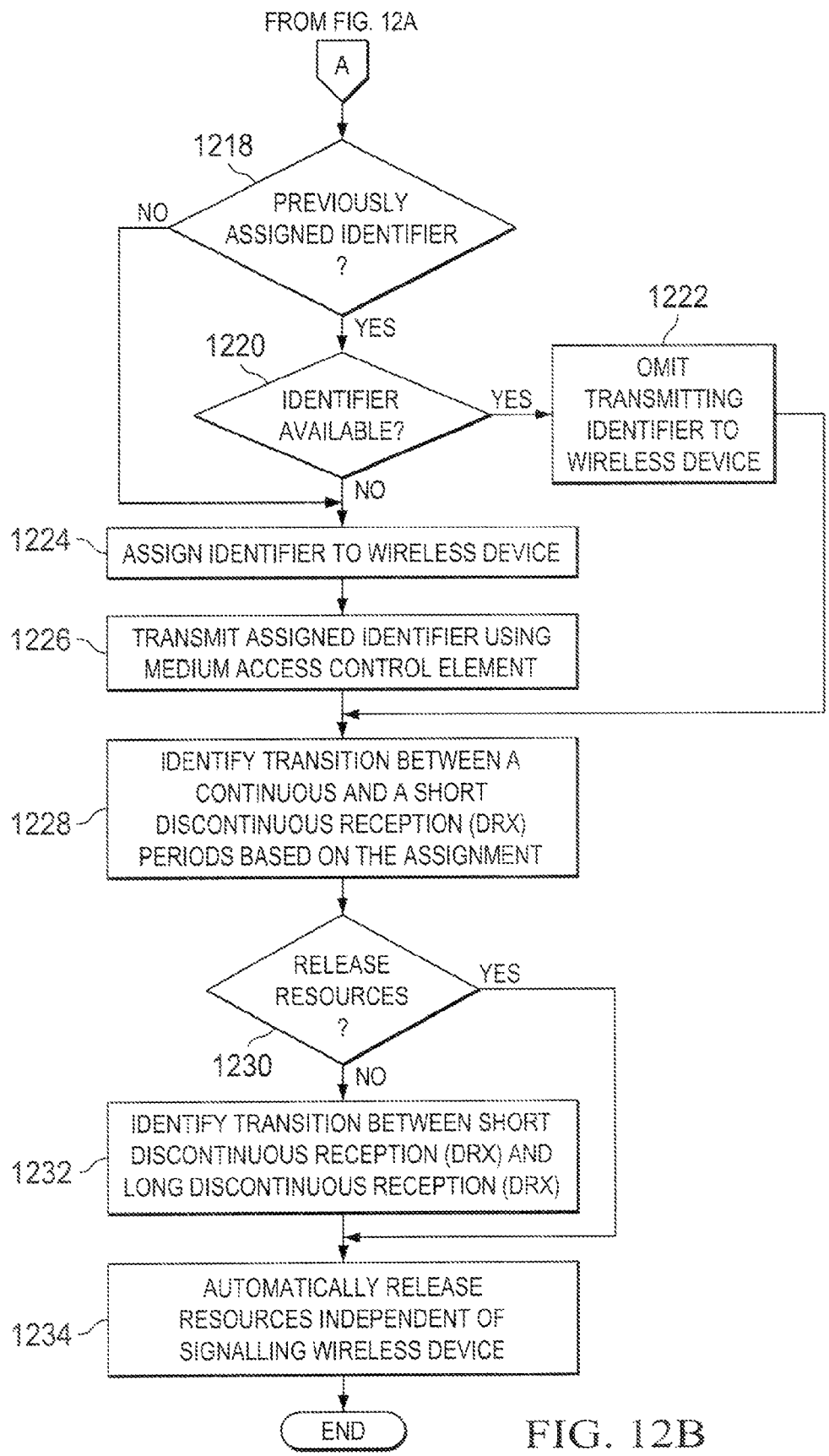

FIGS. 12A-B are a flow chart illustrating an example method 1200 for efficiently allocating resources and implicitly releasing resources based on a DRX sub-state transition. The illustrated method 1200 is described with respect to system 300 of FIG. 4, but this method could be used by any other suitable system. Moreover, system 300 may use any other suitable techniques for performing these tasks. Thus, many of the steps in this flowchart may take place simultaneously and/or in different orders as shown. System 300 may also use methods with additional steps, fewer steps, and/or different steps.

At a high level, method 1200 includes four high-level processes: (1) generating a known relationship between resource identifiers and a set of resource attributes (or resource configurations that describe or relate to the resource attributes) from step 1202 to 1206; (2) providing the known relationship to a wireless device from step 1208 to 1214; (3) assigning a resource identifier to the wireless device from step 1216 to 1226; and (4) releasing the resources from step 1228 to 1234. The frequency, time and code resources are associated with a resource identifier via step 1202. For example, eNB 310a may generate a plurality of combinations of resource attributes that are available and associate each combination of resource attributes with a resource identifier. Starting with the generating process, frequency, time and code resources that are available to the wireless network are identified at step 1204. For example, eNB 310a may identify frequency, time and/or code resources available for communicating with a UE such as UE 305. A resource identifier may be assigned to a UE such as UE 305. Specifically, at step 1206, an identifier is assigned to each resource attribute combination to generate a known relationship between the resource identifiers and the set of resource attributes to which each identifier relates. In the example, the eNB 310a may generate a known relationship which may be mapped or stored or may be represented in tabulated or other convenient format, or which may be represented via mathematical means or formulae. However so achieved, the known relationship identifies a correspondence between resource identifiers and combinations of resource attributes or parameters that relate to the resource attributes.

Figure 13A:
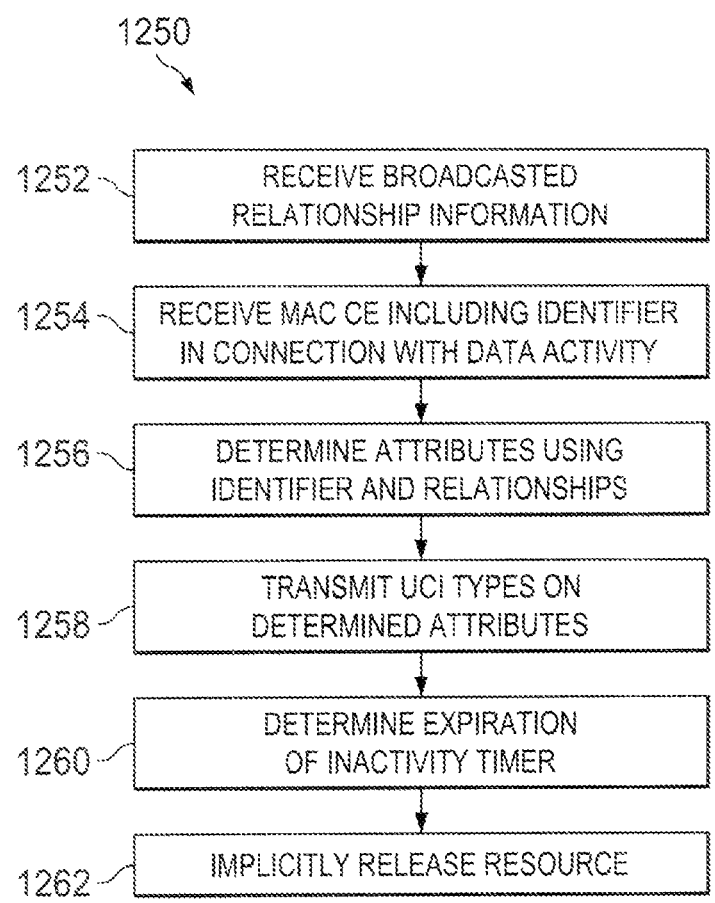
FIGS. 13A-B are a flow chart illustrating an example methods for receiving known relationships.
Figure 13B:
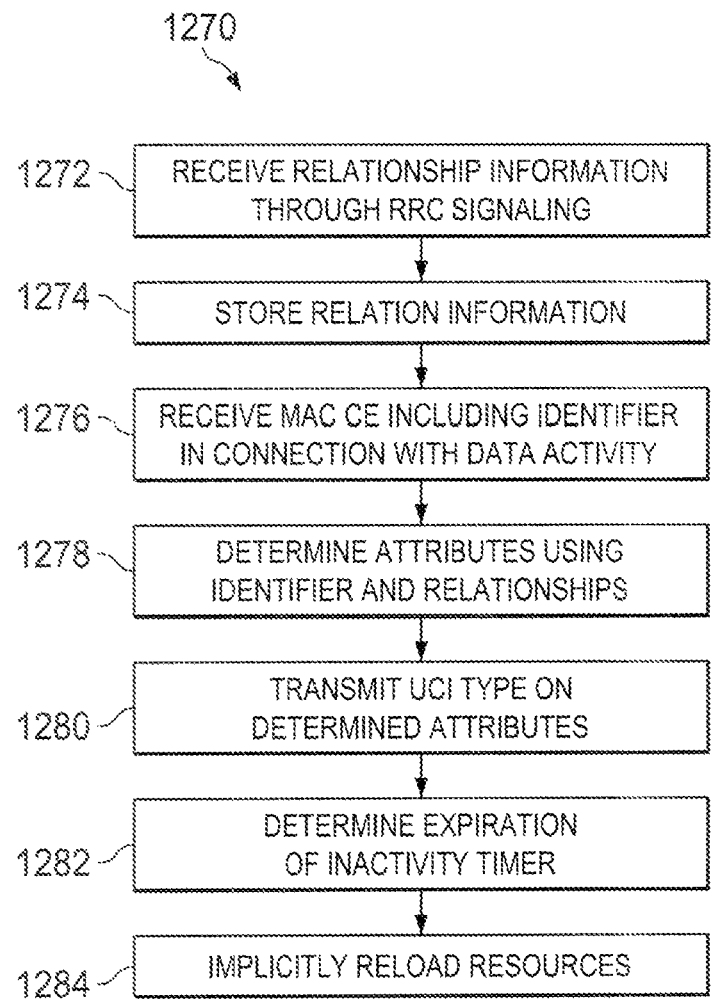

Turning to the process by which the known relationship or map is distributed, two possibilities are illustrated in FIGS. 13A and 13B. Although not illustrated, other possible mechanisms exist by which the known relationship may be distributed or communicated to the UE as has been previously described.

In FIG. 13A, an eNB (such as eNB 310a) broadcasts system information throughout a cell under its control. The broadcast system information contains a description of the known relationship(s) (such as known relationships 1520, 1540) relating resource identifiers 1510 to combinations of resource attributes 1550. At step 1252, a UE (such as UE 305) reads the broadcast system information and stores the conveyed known relationship information. On commencement of data activity, the eNB determines one or more free resource identifiers (such as resource identifier 1510a) and transmits a MAC CE to the UE containing one or more of the assigned resource identifiers. The UE receives the MAC CE and the one or more assigned resource identifiers at step 1254 and determines the corresponding set of resource attributes for each using the stored known information at step 1256. The UE is then in possession of knowledge concerning the exact time, frequency and code resources that it may use for transmission of uplink control information. At step 1258, the UE proceeds to transmit one or more UCI types on the determined resource attributes. At step 1260, both the eNB and the UE determine that a drx-InactivityTimer 708a has expired based on the absence of any new data for a predetermined time period. As a result of the expiry of the drx-InactivityTimer, a transition to a short or long DRX sub-state is executed and the assigned uplink resources for UCI transmission are implicitly released at step 1262.

In FIG. 13B, an eNB (such as eNB 310a) determines that a UE (such as UE 305) has connected to a cell under its control. The eNB transmits message to the UE using dedicated RRC signaling, information containing a description of the known relationship(s) (such as known relationships 1520, 1540) relating resource identifiers 1510 to combinations of resource attributes 1550. The UE reads at step 1272 and stores the known information contained within the dedicated RRC signaling message at step 1274. On commencement of data activity, the eNB determines one or more free resource identifiers (such as resource identifier 1510a) and transmits a MAC CE to the UE containing one or more of the assigned resource identifiers. The UE receives the MAC CE and the one or more assigned resource identifiers at step 1276 and determines the corresponding set of resource attributes 1550 for each using the stored known relationship(s) at step 1278. The UE is then in possession of knowledge concerning the exact time, frequency and code resources that it may use for transmission of uplink control information. At step 1280, the UE proceeds to transmit one or more UCI types on the determined resource attributes. At step 1282, both the eNB and the UE determine that a drx-InactivityTimer has expired based on the absence of any new data for a predetermined time period. As a result of the expiry of the drx-InactivityTimer, a transition to a short or long DRX sub-state is executed and the assigned uplink resources for UCI transmission are implicitly released at step 1284.

Turning to the process by which the known relationship or map is distributed, an indication that a wireless device is entering a cell of an eNodeB is received at step 1208. As for the example, the eNB 310a may receive information (e.g., RRC connection setup request, attach request, registration request, handover) indicating that the UE 305 has entered a cell of the eNB 310a. If the device is not a new device to the cell at decisional step 1210, then execution proceeds to decisional step 1212. If the wireless device does not receive a new known relationship or map subsequent to cell or data activity, an updated known relationship or resource map is transmitted to the wireless device at step 1214. In one example, the eNB 310a may determine if the UE 305 has previously registered with the cell and also determine whether the known relationship or resource map has been updated since the prior cell activity. Returning to decisional step 1210, if the device is new to the cell, then execution proceeds to step 1214 where a resource map is transmitted to the wireless device. Returning to decisional step 1212, if a new known relationship or map has not been generated since prior cell or data activity, then execution proceeds to step 1216.

Turning to the assigning process, a request for wireless resources is received at step 1216. Again in the example, the eNB 310a may receive a request from UE 305 to assign wireless resources or, alternatively, new data arrives at the eNB from a core network node (such as SGW 320) and requires onward delivery to the UE. If an identifier was previously assigned at decisional step 1218, then execution proceeds to decisional step 1220. If the previously assigned identifier is still available for subsequent assignment, then, at step 1222, no identifier is transmitted to the wireless device. In the example, the eNB 310a may determine that an identifier previously-assigned to the UE 305 is currently available. In these instances, the eNB 310a may assign the previously-assigned identifier to the UE 305 but omit transmitting the identifier to the UE 305. In response to not receiving an identifier, the UE 305 may determine that the previously-assigned identifier has been assigned to the UE 305. If either an identifier was not previously assigned or the previously-assigned identifier is not available, then, at step 1224, an identifier is assigned to the wireless device. The identifier is transmitted to the wireless device using a MAC control element. As for the example, the eNB 310a may assign an identifier and transmit the assigned identifier to the 1226 independent of transmitting additional signals to the UE 305 for assigning resources.

Turning to the release process, a transition between continuous reception and short DRX is identified, at step 1228. The transition may be based on expiration of a drx-InactivityTimer and may be independent of signaling between the wireless device and wireless network. In one example, the eNB 310a determines that the UE 305 transitions from continuous reception to short DRX based on the resources assigned by the identifier. In these instances, the eNB 310a may determine the transition independent of signaling between the eNB 310 and UE 305. If the resources are not released at this transition at decisional step 1230, then, at step 1232, the transition between the short and long DRX is identified. Again in the example, the eNB 310a determines that the release of resources does not occur at the transition between continuous reception and the short DRX cycle and waits to identify the transition between the short DRX and the long DRX using the resource map. Returning to decisional step 1230, if a release occurs at the initial transition, then, at step 1234, the resource is released from the wireless device independent of signaling the wireless device. As for the example, the UE 305 and the eNB 310a may independently determine that the assigned resource is released at a transition and the eNB 310a releases the resources independent of signaling the UE 305.

Figure 14:
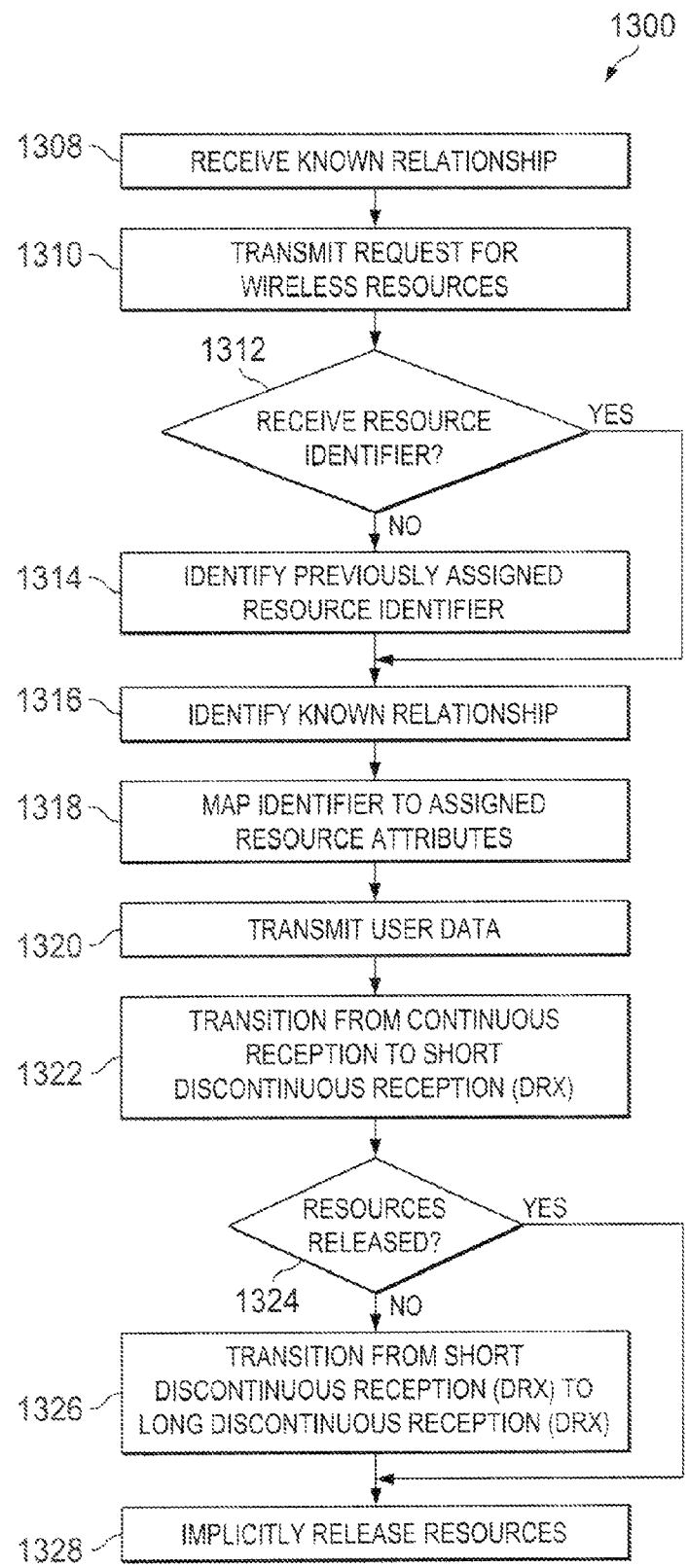
FIG. 14 is a flow chart illustrating an example method for releasing of wireless resources based on a DRX cycle.

FIG. 14 is flow chart illustrating an example method 1300 for identifying an implicit release of wireless resources based on a DRX sub-state transition. The illustrated method 1300 is described with respect to system 300 of FIG. 3, but this method could be used by any other suitable system. Moreover, system 300 may use any other suitable techniques for performing these tasks. Thus, many of the steps in this flowchart may take place simultaneously and/or in different orders as shown. System 300 may also use methods with additional steps, fewer steps, and/or different steps, so long as the methods remain appropriate.

At a high level, method 1300 includes three high-level processes: (1) receiving one or more known relationships enabling an association between resource identifiers and a set of resource attributes (or resource parameters that describe or relate to the resource attributes) from step 1302 to 1308; (2) identifying assignment of resource attributes from step 1310 to 1318; (3) transmitting user data at step 1320; and (4) releasing the resources from step 1322 to 1328. Turning to receiving the known relationship(s) between the identifiers and the resource attributes, a registration request is transmitted to the wireless network at step 1302. For example, UE 305 may transmit a registration request to eNB 310a indicating that the UE 305 has entered a cell of the eNB 310a. If the UE previously access the resources of the wireless network at decisional step 1304, then execution proceeds to decisional step 1306. If a new known relationship has been generated since prior cell activity, an updated resource map is received from the wireless network at step 1308. In the example, the eNB 310a may determine if the UE 305 has previously registered with the cell and whether the resource map has been updated subsequent to cell activity. Returning to decisional step 1304, if the UE is new to the cell, then execution proceeds to step 1308 where a known relationship is received from the wireless network. Returning to decisional step 1306, if a new known relationship has not been generated since prior cell activity, then execution proceeds to step 1310.

Turning to assigning resources process, a request for wireless resources is transmitted to the wireless network at step 1310. The UE 305 may transmit a request to access wireless resources to the eNB 310*a*. If a resource identifier is not received at decisional step 1312, then, at step 1314, a previously-assigned resource identifier is identified independent of signaling from the wireless network. If a resource identifier is received, then, at step 1316, a mapping of identifiers to resources is identified. In the example, the UE 305 may use a previously-assigned resource identifier if a resource identifier is not received from the eNB 310*a* within a specified period of time. Otherwise, the UE 305 may receive a resource identifier if new to the eNB 310*a* or the previously-assigned resource identifier is assigned to a different UE. Regardless, in the example, the UE 305 identifies the known relationship to determine the assigned resource attributes. Next, at step 1318, the assigned resource attributes are determined by mapping the identifier using the known relationship between identifiers and the resource attributes. As for the example, the UE 305 maps or otherwise correlates the identifier to the assigned resources using the resource map. At step 1320, user data is transmitted to the wireless network.

Turning to the release process, a transition from continuous reception to short DRX is identified at step 1322. In the example, after a period of inactivity, the receiver of the UE 305 transitions from continuous reception to short DRX. If the resource is not released at decisional step 1324, then, at step 1326, a period of time passes before a transition from short DRX to long DRX is identified at step 1326. The UE 305 determines whether the resources have been released at the initial transition and, if not, determines when the transition from the short DRX to the long DRX occurs. At step 1328, the UE releases the resources. Returning to the example, the UE 305 releases the wireless resources based on the transition to a DRX cycle and the known relationship.

In some implementations, a method includes receiving an identifier associated with resource configurations in a wireless network. The identifier is mapped to a resource configuration in a plurality of resource configurations. The user equipment applies the resource configuration.

Various implementations may include one or more of the following features. The EU communicates with the wireless network using the resource configuration. At least one signal is transmitted using the resource configuration. The resource configuration is implicitly released when the user equipment transitions away from a continuous reception mode to a discontinuous reception (DRX) mode. The resource configuration is implicitly released upon expiry of an inactivity timer associated with the UE. The at least one transmitted signal is a control signal. The plurality of resource configurations comprise a predefined mapping using defined rules, equations, or relationships. Rules defining the plurality of resource configurations is received via common signaling within the cell. The EU receives rules defining the plurality of resource configurations via dedicated signaling to a UE. An explicit list of the plurality of resource configurations is received via common signaling within the cell. An explicit list of the plurality of resource configurations is received via dedicated signaling to a UE. The resource configuration is allocated when the user equipment transitions from a DRX mode to a continuous reception mode. The identifier is received in a medium access control (MAC) message. The identifier is received in a MAC control element within a MAC message. If the identifier is not received, then the user equipment uses a previously assigned resource configuration.

In some implementations, user equipment includes memory and at least one processor. The memory configured to store an identifier. The at least one processor configured to receive the identifier associated with resource configurations in a wireless network. map the identifier to a resource configuration in a plurality of resource configurations, and apply by user equipment (UE) the resource configuration.

Various implementations may include one or more of the following features. The at least one processor is further configured to implicitly release the resource configuration when the user equipment transitions away from a continuous reception mode to a DRX mode. The at least one processor is further configured to implicitly release the resource configuration upon expiry of an inactivity timer associated with the UE. The at least one transmitted signal is a control signal. The plurality of resource configurations includes a predefined mapping using defined rules, equations, or relationships. The processors further configured to receive rules defining the plurality of resource configurations via common signaling within the cell. The processors further configured to receive rules defining the plurality of resource configurations via dedicated signaling to a UE. The processors further configured to receive an explicit list of the plurality of resource configurations via common signaling within the cell. The processors further configured to receive an explicit list of the plurality of resource configurations via dedicated signaling to a UE. The resource configuration is allocated when the user equipment transitions from a DRX mode to a continuous reception mode. The processors further configured to receive the identifier in a MAC message. The processors further configured to receive the identifier in a MAC control element within a MAC message. The processors further configured to use a previously assigned resource configuration if the UE does not receive the identifier from the network.

In some implementations, a method includes transmitting an identifier to a user equipment. The identifier identifies a resource configuration in a plurality of resource configurations. The wireless network communicates with the UE after the UE applied the resource configuration. The resource configuration is implicitly released when the user equipment transitions away from a continuous reception mode to a DRX mode. A released resource configuration is allocated to another user equipment. The at least one transmitted signal is a control signal. The identifier is transmitted in a MAC message. The identifier is transmitted in a MAC control element within a MAC message. The plurality of resource configurations includes a predefined mapping using defined rules, equations, or relationships. Rules defining the plurality of resource configurations are signaled via common signaling within the cell. Rules defining the plurality of resource configurations is signaled via dedicated signaling to a UE. An explicit list of the plurality of resource configurations is signaled via common signaling within the cell. An explicit list of the plurality of resource configurations is signaled via dedicated signaling to a UE.

A method includes assigning resources of a wireless network to a wireless device including a receiver. A transition from a first pattern of activity of the wireless-device receiver to a second pattern of activity of the wireless-device receiver is identified. The second pattern of activity includes a plurality of inactive periods of the receiver and a plurality of active periods of the receiver. The assigned resources are automatically released based, at least in part, on the identified transition, the resources released independent of signaling between the wireless device (e.g., without transmitting explicit signaling) and the wireless network to release the resources. Assigning resources of the wireless network can include receiving a request from the wireless device for resources in the wireless network, identifying a mapping between each of a plurality of identifiers and a combination of resources or resource attributes in the wireless network, assigning an identifier from the plurality of identifiers to the wireless device, and transmitting the identifier to the wireless device independent of transmitting signaling to assign each resource attribute in the combination. Independent of transmitting signaling to allocate each resource in the combination includes independent of transmitting signaling for each of a time resource, frequency resource, and a code resource. A MAC message or physical layer message (such as may be sent on a PDCCH) may include the identifier. The first pattern includes a single period of continuous receiver activity or a plurality of inactive periods less than the inactive periods of the second pattern. The wireless resources includes initial wireless resources, the identifier includes an initial identifier, the wireless device includes a first wireless device, and the method may further include receiving a request for subsequent resources in the wireless network after the release of the initial wireless resources, determine the initial identifier is assigned to a second wireless device, allocate a subsequent identifier different from the initial identifier to the wireless device, and transmit the subsequent identifier to the first wireless device independent of transmitting signaling to assign each resource to the first wireless device. The method can also include identifying a plurality of wireless-network resources, combining the plurality of resources to form a plurality of a combination of resources, and assigning an identifier to each combination in the plurality of combinations to generate a mapping between identifiers and a combination of resources. The method can also include receiving information indicating the wireless device entered the wireless network; and transmitting the mapping between the identifiers and the combination of resources in connection with the wireless device entering the wireless network. The wireless network includes an evolved Universal Mobile Telecommunications System (UMTS) Terrestrial Radio Access Network (E-UTRAN), the second pattern comprises at least one of short Discontinuous Reception (DRX) or long DRX.

In some implementations, a method includes identifying resources of a wireless network assigned to a wireless device including a receiver, transitioning from a first pattern of activity of the wireless-device receiver to a second pattern of activity of the wireless-device receiver, the second pattern of activity includes a plurality of inactive periods of the receiver and a plurality of active periods of the receiver; and determining that the wireless network should automatically release the assigned resources based, at least in part, on the transition, on identifying the resources released independent of signaling between the wireless device and the wireless network to release the resources. Allocating resources of the wireless network may include transmitting a request to the wireless network for resources in the wireless network, receiving an identifier from the wireless network, and determining the assigned resources by comparing the received identifier to a mapping between a plurality of identifiers and a combination of resources in the wireless network. The assigned resources are determined independent of transmitting signaling to assign each resource in the combination. A MAC message or physical layer message (such as may be sent on a PDCCH) can include the identifier. The first pattern can include a single period of continuous receiver activity or a plurality of inactive periods less than the inactive periods of the second pattern. The wireless resources can include initial wireless resources, the identifier can include an initial identifier, the wireless device can include a first wireless device, and the method can further include transmitting a request for subsequent resources in the wireless network after the release of the initial wireless resources, determining a subsequent identifier failed to be transmitted within a specified time period, and identifying a previously-assigned identifier in response to at least the determination. The method can further include transmitting a registration request to the wireless network, and receiving a mapping between the identifiers and the combination of resources in connection with the wireless device entering the wireless network. The wireless network can include an E-UTRAN, the second pattern comprises at least one of short DRX or long DRX.

The disclosed and other embodiments and the functional operations described in this document can be implemented in digital electronic circuitry, or in computer software, firmware, or hardware, including the structures disclosed in this document and their structural equivalents, or in combinations of one or more of them. The disclosed and other embodiments can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this document can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

While this document contains many specifics, these should not be construed as limitations on the scope of an invention that is claimed or of what may be claimed, but rather as descriptions of features specific to particular embodiments. Certain features that are described in this document in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or a variation of a sub-combination. Similarly, while operations are depicted in the drawings in a particular order, this should not be understood as requiring that such operations be performed in the particular order shown or in sequential order, or that all illustrated operations be performed, to achieve desirable results.

Only a few examples and implementations are disclosed. Variations, modifications, and enhancements to the described examples and implementations and other implementations can be made based on what is disclosed.

What is claimed is:

1. A method performed at a user equipment (UE), comprising:
    receiving, from a wireless network, by the UE, a mapping for a plurality of resource identifiers, each resource identifier mapped to an uplink resource configuration for each of a plurality of uplink control information (UCI) types;
    receiving a message including an assigned resource identifier;
    determining, by the UE, an uplink resource configuration for a UCI type mapped to the assigned resource identifier based on the received mapping, wherein the UCI type includes at least one of: channel quality indication (CQI), precoding matrix indication (PMI), rank indication (RI), dedicated scheduling request (DSR), or sounding reference signal (SRS); and
    transmitting, by the UE, UCI corresponding to the UCI type using an uplink resource configuration corresponding to the determined uplink resource configuration.

2. The method of claim 1, wherein the uplink resource configurations correspond to a plurality of resource attributes.

3. The method of claim 1, wherein the plurality of uplink resource configurations are configured in the UE by receiving system information.

4. The method of claim 1, wherein the plurality of uplink resource configurations are implicitly released, at the user equipment.

5. The method of claim 4, wherein the uplink resource configurations are released based on a data transmission inactivity.

6. The method of claim 4, wherein the uplink resource configurations are released based on change of DRX pattern.

7. A user equipment (UE), comprising:
    memory; and
    at least one processor configured to:
        receive, from a wireless network, by the UE, a mapping for a plurality of resource identifiers, each resource identifier mapped to an uplink resource configuration for each of a plurality of uplink control information (UCI) types;
        receive a message including an assigned resource identifier;
        determine by the UE an uplink resource configuration for a UCI type mapped to the assigned resource identifier based on the received mapping, wherein the UCI type includes at least one of: channel quality indication (CQI), precoding matrix indication (PMI), rank indication (RI), dedicated scheduling request (DSR), or sounding reference signal (SRS); and
        transmit, by the UE, UCI corresponding to the UCI type using an uplink resource configuration corresponding to the determined uplink resource configuration.

8. The UE of claim 7, wherein the uplink resource configurations correspond to a plurality of resource attributes.

9. The UE of claim 7, wherein the at least one processor is further configured to configure the plurality of uplink resource configurations by receiving system information.

10. The UE of claim 7, wherein the at least one processor is further configured to implicitly release the plurality of uplink resource configurations.

11. The UE of claim 10, wherein the at least one processor is further configured to release the uplink resource configurations based on a data transmission inactivity associated with the UE.

12. The UE of claim 10, wherein the at least one processor is configured to release the uplink resource configurations based on change of DRX pattern.

13. A method at a wireless network, comprising:
    transmitting a mapping to a user equipment (UE), the mapping for a plurality of resource identifiers, each resource identifier mapped to an uplink resource configuration for each of a plurality of uplink control information (UCI) types;
    transmitting a message including an assigned resource identifier; and
    receiving, from the UE, UCI corresponding to the UCI type using an uplink resource configuration corresponding to the determined uplink resource configuration, wherein the UCI type includes at least one of: channel quality indication (CQI), precoding matrix information (PMI), rank indication (RI), dedicated scheduling request (DSR), or sounding reference signal (SRS).

14. The method of claim 13, wherein the uplink resource configurations correspond to a plurality of resource attributes.

15. The method of claim 13, wherein the uplink resource configurations are implicitly released.

16. The method of claim 15, wherein the uplink resource configurations are released based on a data transmission inactivity.

17. The method of claim 15, wherein the uplink resource configurations are released based on change of DRX pattern of the UE.

18. The method of claim 13, wherein the plurality of uplink resource configurations are configured in the UE by using system information.

19. A wireless network node comprising at least one processor configured to:
- transmit a mapping to a user equipment (UE), the mapping for a plurality of resource identifiers, each resource identifier mapped to an uplink resource configuration for each of a plurality of uplink control information (UCI) types;
- transmit a message including an assigned resource identifier; and
- receive, from the UE, UCI corresponding to the UCI type using an uplink resource configuration corresponding to the determined uplink resource configuration, wherein the UCI type includes at least one of: channel quality indication (CQI), precoding matrix information (PMI), rank indication (RI), dedicated scheduling request (DSR), or sounding reference signal (SRS).

20. The wireless network node of claim 19, wherein the uplink resource configurations correspond to a plurality of resource attributes.

21. The wireless network node of claim 19, wherein the at least one processor is further configured to implicitly release the plurality of uplink resource configurations.

22. The wireless network node of claim 21, wherein the at least one processor is configured to release the uplink resource configurations based on a data transmission inactivity.

23. The wireless network node of claim 21, wherein the at least one processor is configured to release the uplink resource configurations based on change of DRX pattern.

24. The wireless network node of claim 19, wherein the at least one processor is configured to configure the plurality of resource configurations in the UE by using system information.

* * * * *